(12) United States Patent
Jang et al.

(10) Patent No.: US 11,528,113 B2
(45) Date of Patent: Dec. 13, 2022

(54) DATA COMMUNICATION METHOD AND APPARATUS IN WIRELESS COMMUNICATION SYSTEM

(71) Applicant: Samsung Electronics Co., Ltd., Suwon-si (KR)

(72) Inventors: Jaehyuk Jang, Yongin-si (KR); Anil Agiwal, Yongin-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/201,373

(22) Filed: Mar. 15, 2021

(65) Prior Publication Data
US 2021/0204157 A1     Jul. 1, 2021

Related U.S. Application Data

(63) Continuation of application No. 16/524,856, filed on Jul. 29, 2019, now Pat. No. 10,959,119.

(30) Foreign Application Priority Data

Jul. 30, 2018   (KR) .................. 10-2018-0088744

(51) Int. Cl.
| | | |
|---|---|---|
| *H04W 24/10* | (2009.01) |
| *H04L 5/00* | (2006.01) |
| *H04L 1/18* | (2006.01) |
| *H04L 1/00* | (2006.01) |
| *H04W 74/08* | (2009.01) |
| *H04L 25/02* | (2006.01) |
| *H04W 72/04* | (2009.01) |
| *H04L 27/26* | (2006.01) |

(52) U.S. Cl.
CPC .......... *H04L 5/0053* (2013.01); *H04L 1/0026* (2013.01); *H04L 1/1819* (2013.01); *H04L 5/0051* (2013.01); *H04L 25/0226* (2013.01); *H04W 24/10* (2013.01); *H04W 72/0493* (2013.01); *H04W 74/0833* (2013.01); *H04L 5/0048* (2013.01); *H04L 27/2602* (2013.01)

(58) Field of Classification Search
None
See application file for complete search history.

(56) References Cited

U.S. PATENT DOCUMENTS

| | | |
|---|---|---|
| 2011/0116364 A1 | 5/2011 | Zhang et al. |
| 2016/0056939 A1 | 2/2016 | Kim et al. |
| (Continued) | | |

OTHER PUBLICATIONS

Extended European Search Report dated Sep. 10, 2021, issued in a counterpart European Application No. 19844245.1-1205 / 3818761.

(Continued)

*Primary Examiner* — Christine T Duong
(74) *Attorney, Agent, or Firm* — Jefferson IP Law, LLP

(57) ABSTRACT

A method of operating a terminal in a wireless communication system is provided. The method includes receiving, from a base station, information associated with a measurement gap for performing measurement of the terminal, the information associated with the measurement gap includes information for a frequency range that the measurement gap is applied to, and performing measurement, during the measurement gap in the frequency range.

10 Claims, 16 Drawing Sheets

(56) References Cited

U.S. PATENT DOCUMENTS

| 2018/0034598 | A1  | 2/2018 | Yiu et al. |
| 2018/0091212 | A1  | 3/2018 | Lee et al. |
| 2019/0253909 | A1  | 8/2019 | Yiu et al. |
| 2020/0008270 | A1* | 1/2020 | Zhang ................ H04L 1/0025 |

OTHER PUBLICATIONS

CMCC: Measurement Gap Configuration for Remaining DC Scenarios, 3GPP TSG-RAN WG2 NR AH1807 Meeting; R2-1810634, Jul. 6, 2018, Montreal, Canada.
Ericsson, Impact of multiple measurement gaps in MAC, R2-1803188, 3GPP TSG-RAN WG2 #101, Athens, Greece, Feb. 15, 2018, See section 2.
Huawei et al., MAC handling during different measurement gaps, R2-1805787, 3GPP TSG-RAN WG2 #101bis, Sanya, China, Apr. 6, 2018, See section 2.
Huawei et al., Discussion on SSB based inter-frequency measurement requirements in NR, R4-1807275, 3GPP TSG-RAN WG4 Meeting #87, Busan, Korea, May 14, 2018, See sections 1-2.2.
Nokia et al., Serving cell measurements and measurement gaps, R2-1713199, 3GPP TSG-RAN WG2 #100, Prague, Czech Republic, Nov. 17, 2017, See sections 1-2.
International Search Report dated Nov. 18, 2019, issued in International Application No. PCT/KR2019/009399.
Korean Office Action dated Oct. 18, 2022, issued in a counterpart Korean Application No. 10-2018-0088744.
Indian Office Action dated Oct. 20, 2022, issued in a counterpart Indian Application No. 202137007299.
Huawei, HiSilicon; Discussion on BWP inactivity timer; 3GPP TSG-RAN2#AH-1801; R2-1800189; Jan. 12, 2018, Vancouver, Canada.
3GPP TS 38.321 V15.2.0; 3rd Generation Partnership Project; Technical Specification Group Radio Access Network; NR; Medium Access Control (MAC) protocol specification (Release 15), Jun. 17, 2018.

* cited by examiner

DATA COMMUNICATION METHOD AND APPARATUS IN WIRELESS COMMUNICATION SYSTEM

CROSS-REFERENCE TO RELATED APPLICATION(S)

This application is a continuation application of prior application Ser. No. 16/524,856, filed on Jul. 29, 2019, which will be issued as U.S. Pat. No. 10,959,119 on Mar. 23, 2021, which is based on and claimed priority under 35 U.S.C. § 119(a) of a Korean patent application number 10-2018-0088744, filed on Jul. 30, 2018, in the Korean Intellectual Property Office, the disclosure of which is incorporated by reference herein in its entirety.

BACKGROUND

1. Field

The disclosure relates to data communication methods and apparatuses in a wireless communication system.

2. Description of Related Art

To meet the demand for ever-increasing wireless data traffic since the commercialization of a 4th-generation (4G) communication system, there have been efforts to develop an advanced 5th generation (5G) system or pre-5G communication system. For this reason, the 5G or pre-5G communication system is also called a beyond 4th-generation (4G) network communication system or post long term evolution (LTE) system. Implementation of the 5G communication system using ultra-frequency (mmWave) bands, e.g., 60 GHz bands, is considered to attain higher data rates. To reduce propagation loss of radio waves and increase a transmission range in the ultra-frequency bands, beamforming, massive multiple-input multiple-output (MIMO), Full Dimensional MIMO (FD-MIMO), array antenna, analog beamforming, large-scale antenna techniques are under discussion. To improve system networks, technologies for advanced small cells, cloud Radio Access Networks (RANs), ultra-dense networks, device to device (D2D) communication, wireless backhaul, moving networks, cooperative communication, Coordinated Multi-Points (CoMP), reception-end interference cancellation, and the like are also being developed in the 5G communication system. In addition, in the 5G communication system, an advanced coding modulation (ACM), e.g., Hybrid FSK and QAM Modulation (FQAM), sliding window superposition coding (SWSC), and an advanced access technology, e.g., filter bank multi carrier (FBMC), non-orthogonal multiple access (NOMA), sparse code multiple access (SCMA) are being developed.

In the meantime, the Internet is evolving from a human-centered connectivity network where humans generate and consume information into an Internet of Things (IoT) network where distributed entities, such as things, transmit, receive, and process information without human intervention. Internet of Everything (IoE) technologies combined with IoT, such as big data processing technologies through connection with a cloud server, for example, have also emerged. To implement IoT, various technologies, such as sensing technology, wired/wireless communication and network infrastructure, service interfacing technology, and security technology are required, and recently, even technologies for sensor network, Machine to Machine (M2M), Machine Type Communication (MTC) for connection between things are being studied. Such an IoT environment may provide intelligent Internet Technology (IT) services that create a new value to human life by collecting and analyzing data generated among connected things. IoT may be applied to a variety of areas, such as a smart home, a smart building, a smart city, a smart car or connected car, a smart grid, health care, smart home appliances and advanced medical services through convergence and combination between existing Information Technologies (IT) and various industrial applications.

In this regard, various attempts to apply the 5G communication system to the IoT network are being made. For example, technologies regarding sensor network, M2M, MTC, etc., are implemented by the 5G communication technologies, such as beamforming, MIMO, array antenna schemes, etc. Even the application of a cloud Radio Access Network (cloud RAN) as the aforementioned big data processing technology may be stated as an example of convergence of 5G and IoT technologies.

With the development of the aforementioned technologies and wireless communication systems, it is possible to provide various services, and there is a need for a method to provide the services smoothly.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method of handling an occasion when a base station additionally uses an identifier in addition to a basic identifier to transmit data reliably to a user equipment (UE).

Another aspect of the disclosure is to provide an error-free communication method through operation of the UE during a set measurement gap.

Additional aspects will be set forth in part in the description which follows and, in part, will be apparent from the description, or may be learned by practice of the presented embodiments.

In accordance with an aspect of the disclosure, a method of operating a terminal in a wireless communication system is provided. The method includes receiving, from a base station, information associated with a measurement gap for performing measurement of the terminal, the information associated with the measurement gap includes information for a frequency range that the measurement gap is applied to, and performing measurement, during the measurement gap in the frequency range.

In accordance with another aspect of the disclosure, a terminal in a wireless communication system is provided. The terminal includes a transceiver, and at least one processor configured to receive, from a base station, information associated with a measurement gap for performing measurement of the terminal, the information associated with the measurement gap includes information for a frequency range that the measurement gap is applied to, and perform measurement, during the measurement gap in the frequency range.

In accordance with another aspect of the disclosure, provided is a non-transitory computer-readable storage medium having a computer readable program stored therein is provided. The computer readable program, when executed on a terminal, causes the terminal to receive, from a base station, information associated with a measurement gap for performing measurement of the terminal, the information associated with the measurement gap includes information for a frequency range that the measurement gap is applied to, and perform measurement, during the measurement gap in the frequency range.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
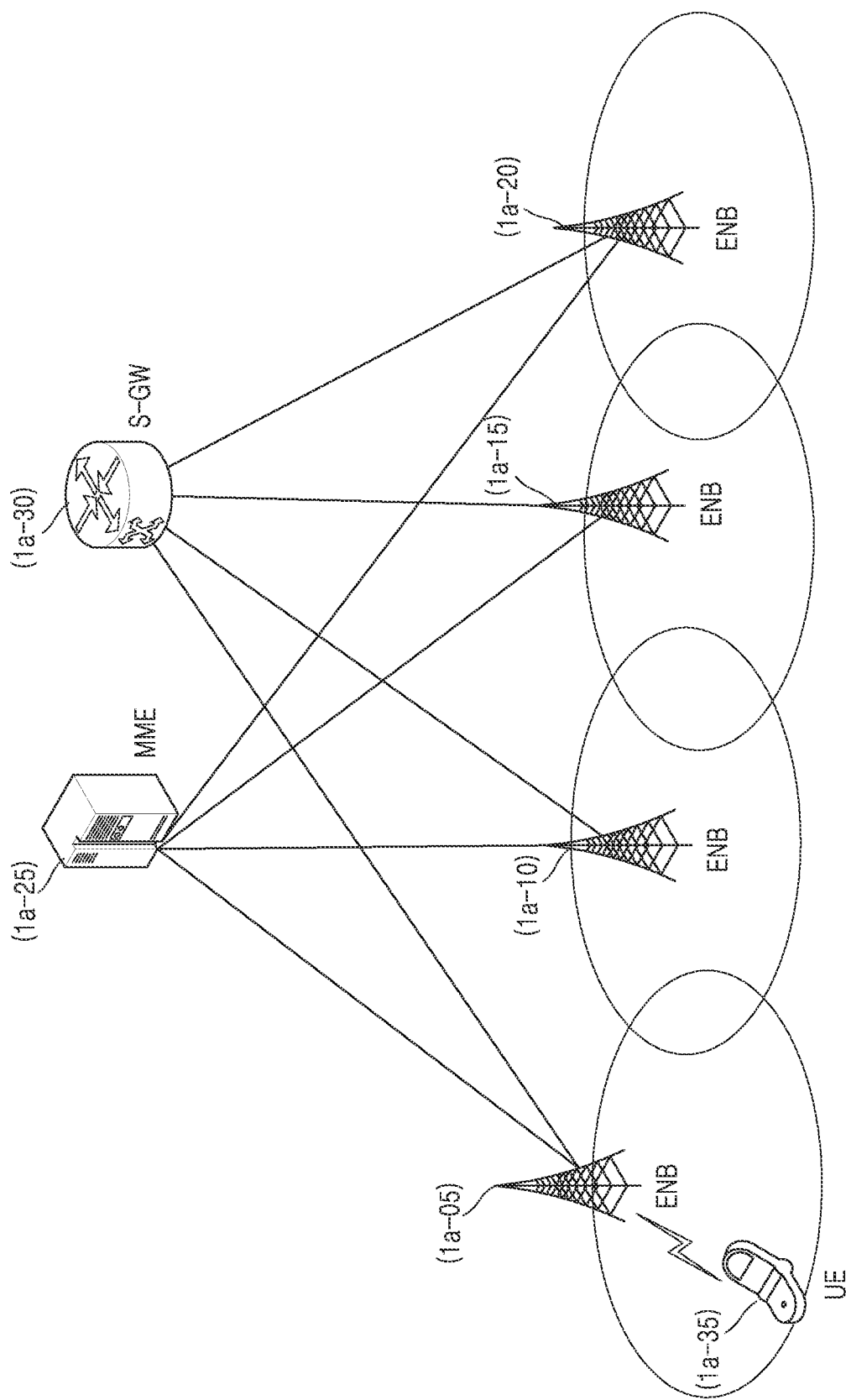
FIG. 1A is a network diagram of a long-term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments descriptions herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that each block and combination of the blocks of a flowchart may be performed by computer program instructions. The computer program instructions may be loaded on a processor of a universal computer, a special-purpose computer, or other programmable data processing equipment, and thus, they generate means for performing functions described in the block(s) of the flowcharts when executed by the processor of the computer or other programmable data processing equipment. The computer program instructions may also be stored in computer-usable or computer-readable memories oriented for computers or other programmable data processing equipment, so it is possible to manufacture a product that contains instruction means for performing functions described in the block(s) of the flowchart. The computer program instructions may also be loaded on computers or programmable data processing equipment, so it is possible for the instructions to generate a process executed by the computer or the other programmable data processing equipment to provide operations for performing functions described in the block(s) of the flowchart.

Furthermore, each block may represent a part of a module, segment, or code including one or more executable instructions to perform particular logic function(s). It is noted that the functions described in the blocks may occur out of order in alternate embodiments of the disclosure. For example, two successive blocks may be performed substantially at the same time or in reverse order depending on the corresponding functions.

The term "module" (or sometimes "unit") as used herein refers to a software or hardware component, such as field programmable gate array (FPGA) or application specific integrated circuit (ASIC), which performs some functions. However, the module is not limited to software or hardware. The module may be configured to be stored in an addressable storage medium, or to execute one or more processors. For example, the modules may include components, such as software components, object-oriented software components, class components and task components, processes, functions, attributes, procedures, subroutines, segments of program code, drivers, firmware, microcode, circuits, data, databases, data structures, tables, arrays, and variables. Functions served by components and modules may be combined into a less number of components and modules, or further divided into a greater number of components and modules. Moreover, the components and modules may be implemented to execute one or more central processing units (CPUs) in a device or security multimedia card. In various embodiments of the disclosure, the module may include one or more processors.

Herein, downlink (DL) refers to a radio transmission path for a signal transmitted from a base station to a user equipment (UE), and uplink (UL) refers to a radio transmission path for a signal transmitted from a UE to a base station. Although the following embodiments of the disclosure will focus on the long term evolution (LTE) or LTE-Advanced (LTE-A) system as an example, they may be applied to other communication systems with similar technical backgrounds or channel types. For example, the 5th generation (5G) mobile communication technologies developed since the LTE-A, such as the 5G new radio (NR), may be included in the systems to which the various embodiments of the disclosure will be applied, and the term '5G' as herein used may be a concept including the existing LTE, LTE-A, or other similar services. Furthermore, various embodiments of the disclosure will also be applied to different communication systems with some modifications to such an extent that does not significantly deviate from the scope of the disclosure as determined by one of ordinary skill in the art.

Herein, the terms to identify access nodes, the terms to refer to network entities, the terms to refer to messages, the terms to refer to interfaces among network entities, the terms to refer to various types of identification information, etc., are examples for convenience of explanation. Accordingly, the disclosure is not limited to the terms as herein used, and may use different terms to refer to the items having the same meaning in a technological sense.

In the following description, for convenience of explanation, terms and definitions used in the most recent standards among the existing communication standards, i.e., in the LTE and NR standard defined in the 3rd Generation Partnership Project (3GPP) will be used. The disclosure is not, however, limited to the terms and definitions, and may equally apply to any systems that conform to other standards. Especially, the disclosure may be applied to the 3GPP NR (which is the 5G mobile communication standard).

Throughout the disclosure, the expression "at least one of a, b or c" indicates only a, only b, only c, both a and b, both a and c, both b and c, all of a, b, and c, or variations thereof.

FIG. 1A is a network diagram of an LTE system according to an embodiment of the disclosure.

The structure of an LTE system as described herein may also be applied to an NR system.

Referring to FIG. 1A, an LTE wireless communication system may include a number of base stations (also referred to as eNBs) 1a-05, 1a-10, 1a-15, and 1a-20, a mobility management entity (MME) 1a-25, and a serving gateway (S-GW) 1a-30. A UE or a terminal 1a-35 may access an external network via the base stations 1a-05, 1a-10, 1a-15, or 1a-20, and the S-GW 1a-30.

The base stations 1a-05, 1a-10, 1a-15, and 1a-20 are access nodes of a communication network to enable UEs to wirelessly access one or more communication networks. The base stations 1a-05, 1a-10, 1a-15, and 1a-20 may collect status information, such as buffer states of UEs, available transmission power states, channel conditions, etc., to provide service traffic to UE 1a-35, and support connection between the UE 1a-35 and a core network (CN) including the MME 1a-258 and the S-GW 1a-30 by scheduling resources for communication between the UE 1a-35 and one or more base stations 1a-05, 1a-10, 1a-15, and 1a-20. The MME 1a-25 is a network device responsible for various control operations as well as mobility management functionality for the UE 1a-35, and may be connected to or in communication with one or more of the base stations 1a-05, 1a-10, 1a-15, and 1a-20. The S-GW 1a-30 is a network device for providing a data bearer. The S-GW 1a-30 may further perform authentication of a UE accessing the network, bearer management, etc., and process packets to be sent to the UE 1a-35 via the base stations 1a-05, 1a-10, 1a-15, or 1a-20 or packets received from the UE 1a-35 via the base stations 1a-05, 1a-10, 1a-15, or 1a-20.

Figure 1B:
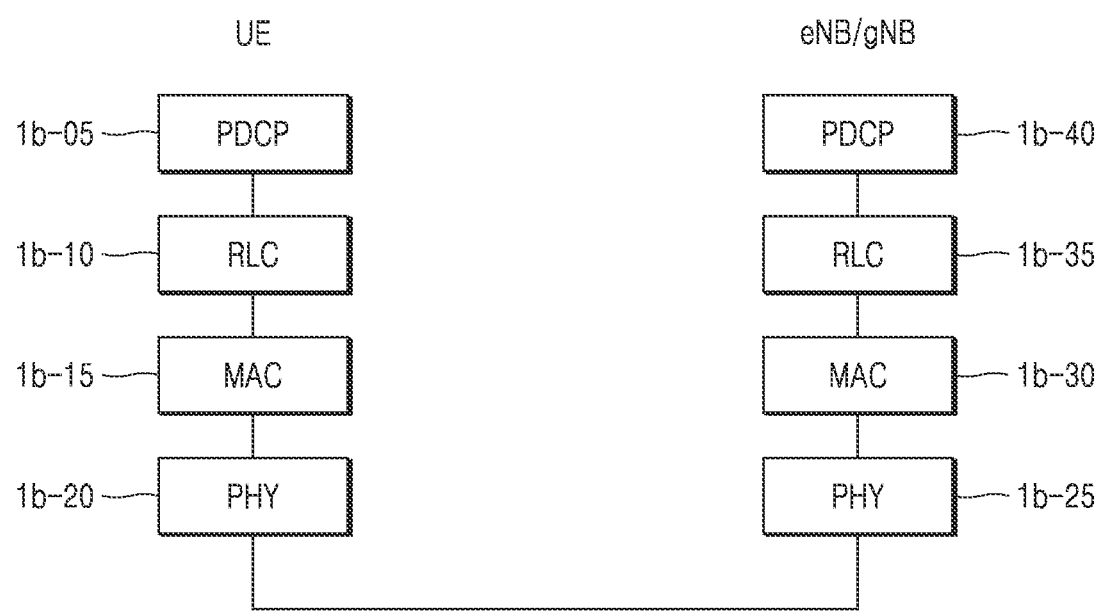
FIG. 1B is a radio protocol architecture for an LTE or New Radio (NR) system according to an embodiment of the disclosure.

FIG. 1B is a radio protocol architecture for an LTE or New Radio (NR) system according to an embodiment of the disclosure.

Referring to FIG. 1B, the radio protocol for an LTE or NR system may include, for each UE and eNB/gNB, a packet data convergence protocol (PDCP) 1b-05 or 1b-40, a radio link control (RLC) 1b-10 or 1b-35, and a medium access control (MAC) 1b-15 or 1b-30.

The PDCP 1b-05 or 1b-40 may perform an operation, e.g., IP header compression/decompression. The RLC 1b-10 or 1b-35 may reconfigure a PDCP packet data unit (PDU) into a suitable size. The MAC 1b-15 or 1b-30 may be connected to a number of RLC layers configured in a single UE, for multiplexing RLC PDUs to a MAC PDU and demultiplexing RLC PDUs from a MAC PDU. Hereinafter, a layer of the radio protocol may also be referred to as an entity.

A physical layer PHY 1b-20 or 1b-25 may perform channel coding and modulation on upper layer data, generate a signal including the data mapped to orthogonal frequency divisional multiplexing (OFDM) symbols, and transmit the signal including the OFDM symbols on a radio channel, or may demodulate a signal including OFDM symbols received on a radio channel, perform channel decoding, and send the resulting data to an upper layer. Furthermore, the PHY 1b-20 or 1b-25 may use the hybrid automatic repeat request (HARQ) for additional error correction such that a receiving device may transmit an indication as to whether a packet has been received from a transmitting device in one bit. This may be called HARQ ACK/NACK information or messages. Downlink HARQ ACK/NACK information for uplink data transmission is sent on a physical hybrid-ARQ Indicator channel (PHICH) for the LTE system, and whether retransmission or new transmission is required may be determined based on scheduling information for the corresponding UE on a physical downlink control channel (PDCCH), on which downlink/uplink resource allocations are sent for the NR system. This is because an asynchronous HARQ may be applied to the NR system. Uplink HARQ ACK/NACK information for downlink data transmission may be sent on a physical uplink control channel (PUCCH) or physical uplink shared channel (PUSCH).

In LTE systems, carrier aggregation (CA) may be implemented to increate bandwidth and bitrate within the communication system. CA may allow a UE to simultaneously communicate with a plurality of base stations. In CA, a cell of a base station may use a primary component carrier in a primary cell (PCell) and a cell of the base station that may use a subcarrier or a secondary component carrier in a secondary cell (SCell).

When CA is implemented, PUCCH may be used for uplink transmission in the PCell. However, as will be described below, a SCell base station may allow the UE to use a PUCCH for additional transmissions in the SCell, which may be referred to as a PUCCH-SCell.

Although not shown, there are RRC layers above the PDCP layers 1b-05 or 1b-40 of the UE and the base station, and the RRC layers may exchange control messages related to access and measurement for radio resource control.

The PHY layer 1b-20 or 1b-25 may include one or multiple frequencies/carriers when CA is implemented, such that a single base station may be capable of assigning and using multiple frequencies simultaneously. Unlike a single carrier being used for communication between a UE and a base station, i.e., an Evolved Universal Terrestrial Radio Access Network (E-UTRAN) NodeB (eNB), CA may use a primary carrier and one or multiple secondary carriers, thereby increasing the amount of data transmission by using the number of secondary carriers.

Furthermore, in a NR system, a concept of bandwidth parts (BWPs) may be introduced a single wide frequency bandwidth to be divided up to allow for more flexible resource allocation. For example, when the UE uses a single serving cell (i.e., there is only a PCell), the resources of a single serving cell may be divided up to operate multiple BWPs such that different signals or signal types may be sent in each BWP. For example, one or more of the multiple BWPs may be activated to transmit or receive data.

Figure 1C:
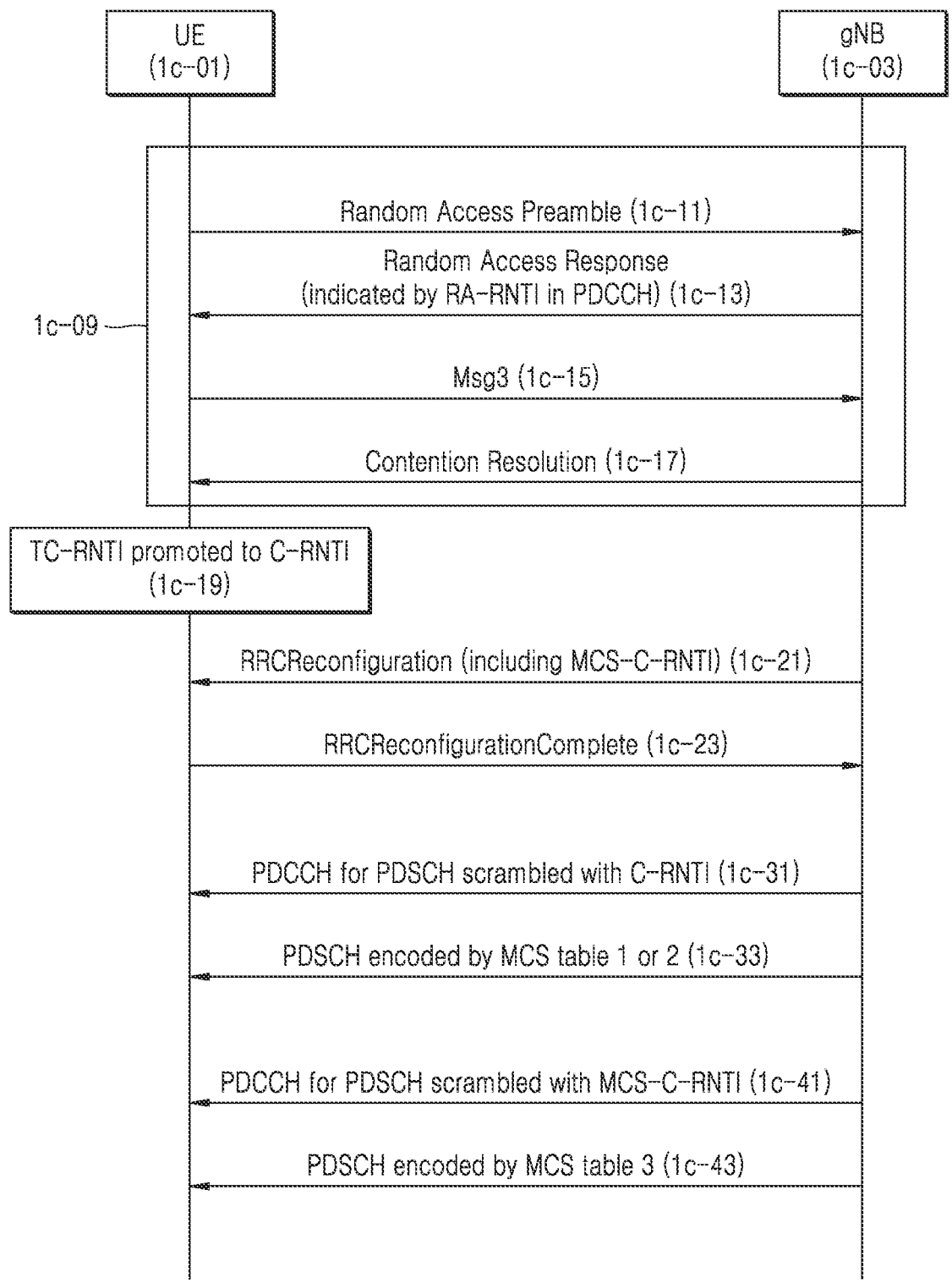
FIG. 1C is a signal flow diagram of a method for communicating data in a wireless communication system according to an embodiment of the disclosure.

FIG. 1C is a signal flow diagram of a method for communicating data in a wireless communication system according to an embodiment of the disclosure.

Although the description below refers to downlink communication, for convenience of explanation, the description regarding downlink transmissions may be similarly applied in a case of uplink transmissions.

Referring to FIG. 1C, assume a scenario in which a UE 1c-01 was previously in an idle mode (e.g., RRC_IDLE) and a triggering event has initiated a transition from the idle mode to a connected mode (e.g., RRC_CONNECTED) in order to establish communication with a base station 1c-03 for data transmission or reception. Accordingly, the UE 1c-01 may initiate this transition by performing a random access procedure (1c-09) with the base station 1c-03.

During the random access procedure (1c-09), the UE 1c-01 may first transmit a random access preamble (1c-11), which is a physical signal designed specifically for uplink synchronization. As the UE 1c-01 has not yet established communication with the base station (gNB) 1c-03, the UE 1c-01 may arbitrarily select and transmit, to the base station 1c-03c, one of many preamble identifiers authorized by the base station 1c-03. Subsequently, the UE 1c-01 may receive a response regarding the preamble identifier from the base station 1c-03, which may be called a random access response (RAR) (1c-13).

In response to receiving the random access preamble (1c-11), the base station 1c-03 may perform resource allocation and determine a network identifier, (e.g., random access-radio network temporary identifier (RA-RNTI)) associated with the UE 1c-01 to generate the RAR (1c-13). The RA-RNTI may be determined based on a time at which the random access preamble (1c-11) is sent from the UE 1c-01. The RAR (1c-13) may include uplink transmission timing adjustment information for the UE 1c-01, uplink resource allocation information for future data transmission, and a temporary cell-RNTI (TC-RNTI).

In response to receiving the RAR (1c-13), the UE 1c-01 may generate and transmit a RRC Connection Request (1c-15). The RRC Connection Request (1c-15) may be a connection request message of the RRC layer to the base station 1c-03 based on the received uplink resource allocation information in the RAR (1c-15). Since the RRC Connection Request (1c-15) message is a third message of the random access procedure, the RRC Connection Request (1c-15) may alternatively be referred to as "Msg3".

The Msg3 (1c-15) may include different information depending on when the UE 1c-01 performs a random access. For example, the RRC Connection Request (1c-15) may reflect whether a contention issue has been detected by the gNB 1c-03. In an exemplary embodiment, the gNB 1c-03 may detect a contention issue (e.g., the different UEs transmit an RRC Connection Request (1c-15) to the gNB 1c-03 at the same time), by determining consistency of content sent in the Msg3 (1c-15) from an MAC control element (MAC CE) called a UE contention resolution identity MAC CE.

In a case that no contention issue is detected or after any contention issue has been resolved, the gNB 1c-03 may transmit the Contention Resolution message (1c-17). For example, the UE (1c-01) may receive a connection setup message of the RRC layer from the base station 1c-03 thereby completing the random access and connection procedure with the base station 1c-03.

When the random access procedure is successfully completed, the UE 1c-01 may promote the TC-RNTI to a cell-RNTI (C-RNTI) such that the TC-RNTI is used as a C-RNTI (1c-19) (e.g., the UE 1c-01 does not receive another network identifier during the random access procedure) for communication with the gNB 1c-03. Alternatively, in a case that the gNB 1c-03 transmits the UE 1c-01 a second network identifier (C-RNTI) during the random access procedure, the UE 1c-01 may use the C-RNTI for communication with the gNB 1c-03. For example, when a contention issue is detected, the gNB 1c-03 may include a second C-RNTI in the Contention Resolution message (1c-17).

When the base station 1c-03 allocates a resource for the UE 1c-01 for data transmission or reception, the base station 1c-03 may generate a resource allocation message for the UE 1c-01. While the UE 1c-01 may receive numerous resource allocation messages (e.g., intended for various UEs in communication with the base station 1c-03), the UE 1c-01 may identify that a particular resource allocation message received from the base station 1c-03 is intended for the UE 1c-01 based on the C-RNTI or the second C-RNTI.

When the base station 1c-03 allocates a resource for the UE 1c-01 for data transmission or reception, the base station 1c-03 may identify a modulation coding scheme (MSC) to be used for data transmission or reception between the base station 1c-03 and the UE 1c-01 during the allocated resources. The base station 1c-03 may inform the UE 1c-01 of the MCS to be used for data transmission or reception.

In an exemplary embodiment, the base station 1c-03 may communicate MCS information associated with a modulation method and a coding method to be used in an allocated time-frequency resource. The base station 1c-03 may include the MCS information to the UE 1c-01 when the resource allocation information is sent. In an exemplary embodiment, four bits of a resource allocation message may correspond to the identified MSC such that the values of the four bits may be different depending on whether the UE 1c-01 supports up to 64QAM or up to 256QAM for downlink transmission.

TABLE 1

| MCS Index $I_{MCS}$ | Modulation Order $Q_m$ | Target code Rate $R_x$ [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | | reserved |
| 30 | 4 | | reserved |
| 31 | 6 | | reserved |

Table 1: MCS index table 1 for PDSCH (in a case that the UE supports up to 64QAM)

TABLE 2

| MCS Index $I_{MCS}$ | Modulation Order $Q_m$ | Target code Rate $R_x$ [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | | reserved |
| 29 | 4 | | reserved |
| 30 | 6 | | reserved |
| 31 | 8 | | reserved |

Table 2: MCS index table 2 for PDSCH (in a case that the UE supports up to 256QAM)

The base station 1c-03 may indicate which one of the tables is used for allocating a resource for the UE 1c-01 based on modulation schemes that the UE supports in the table. For example, the base station 1c-03 may determine which MCS index table is appropriate based on the supported capabilities of the UE 1c-01. The base station 1c-03 may transmit the selected MCS index table to the UE 1c-01 prior to sending a resource allocation message. In an exemplary embodiment, the base station 1c-03 may generate a resource allocation message that indicates the MCS to be used for communication for the allocated resources by including four bits associated with a particular MCS index ($I_{MCS}$) value in the resource allocation message.

Table 1 represents a case that the UE 1c-01 supports a modulation scheme of 64QAM, and Table 2 represents a case that the UE 1c-01 supports a modulation scheme of 256QAM. In comparison to Table 1, Table 2 may further include a modulation order of 8. However, it is merely an example, and is not limited to the content in the table.

The next generation communication standards support a greater variety of scenarios than before, and for example, there may be a scenario to support more reliable communication than before. For example, when highly reliable communication needs to be supported assuming error probability of $10^{-5}$, transmission is required at a lower coding rate. For example, in order for a receiving device to recover from a possible error, data of a certain size may be sent in more bits. For this, a new MCS table (in addition to Table 1 and Table 2 discussed above) needs to be supported.

When the UE supports an MCS for high reliability, in order for the UE to use an MCS table according to Table 3, the eNB may designate an MCS table or allocate an additional RNTI associated with the MCS Table 3. Herein, the additional RNTI may be referred to as an MCS-C-RNTI.

TABLE 3

| MCS Index $I_{MCS}$ | Modulation Order $Q_m$ | Target code Rate $R_x$ [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |

TABLE 3-continued

| MCS Index $I_{MCS}$ | Modulation Order $Q_m$ | Target code Rate $R_x$ [1024] | Spectral efficiency |
|---|---|---|---|
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

Table 3: MCS index table 3 for PDSCH (used for ultra-reliable data transmission).

When the UE 1c-01 is capable of operating in a NR system, the UE 1c-01 may be allocated an MCS-C-RNTI. In an exemplary embodiment, the base station 1c-03 may communicate the MCS-C-RNTI to the UE 1c-01 in a RRCReconfiguration message (1c-21). In response to the RRCReconfiguration message (1c-21), the UE 1c-01 may transmit an RRCReconfigurationComplete message (1c-23).

When an MCS-C-RNTI is additionally allocated to the UE 1c-01, the UE 1c-01 may check each resource allocation message received from the base station 1c-03 to determine whether the resource allocation message is intended for the UE 1c-01 based on either the C-RNTI or the MCS-C-RNTI.

For example, the base station 1c-03 may transmit a first resource allocation message (1c-31) scrambled with the C-RNTI. The first resource allocation message (1c-31) may include at least an identification of the PDSCH in which resources are allocated to the UE 1c-01 and an MCS index value selected from Table 1 or Table 2 based on the UE's capabilities. The base station 1c-03 may then transmit data (1c-33) to the UE 1c-01 on the PDSCH identified in the first resource allocation message (1c-31). The data (1c-33) may be encoded using the MCS corresponding to the MCS index value included in the first resource allocation message (1c-31).

Additionally or alternatively, the base station 1c-03 may transmit a second resource allocation message (1c-41) scrambled with the MCS-C-RNTI. The second resource allocation message (1c-43) may include at least an identification of the PDSCH in which resources are allocated to the UE 1c-01 and an MCS index value selected from Table 3. The base station 1c-03 may then transmit data (1c-43) to the UE 1c-01 on the PDSCH identified in the second resource allocation message (1c-41). The data (1c-41) may be encoded using the MCS corresponding to the MCS index value included in the second resource allocation message (1c-41).

By allocating an additional network identifier to the UE 1c-01, this may enable the base station 1c-03 to dynamically allocate resources for the UE 1c-01 by determining an RNTI to be included in the resource allocation message from a plurality of different RNTI's based on the type of data to be transmitted to the UE 1c-01.

Figure 1D:
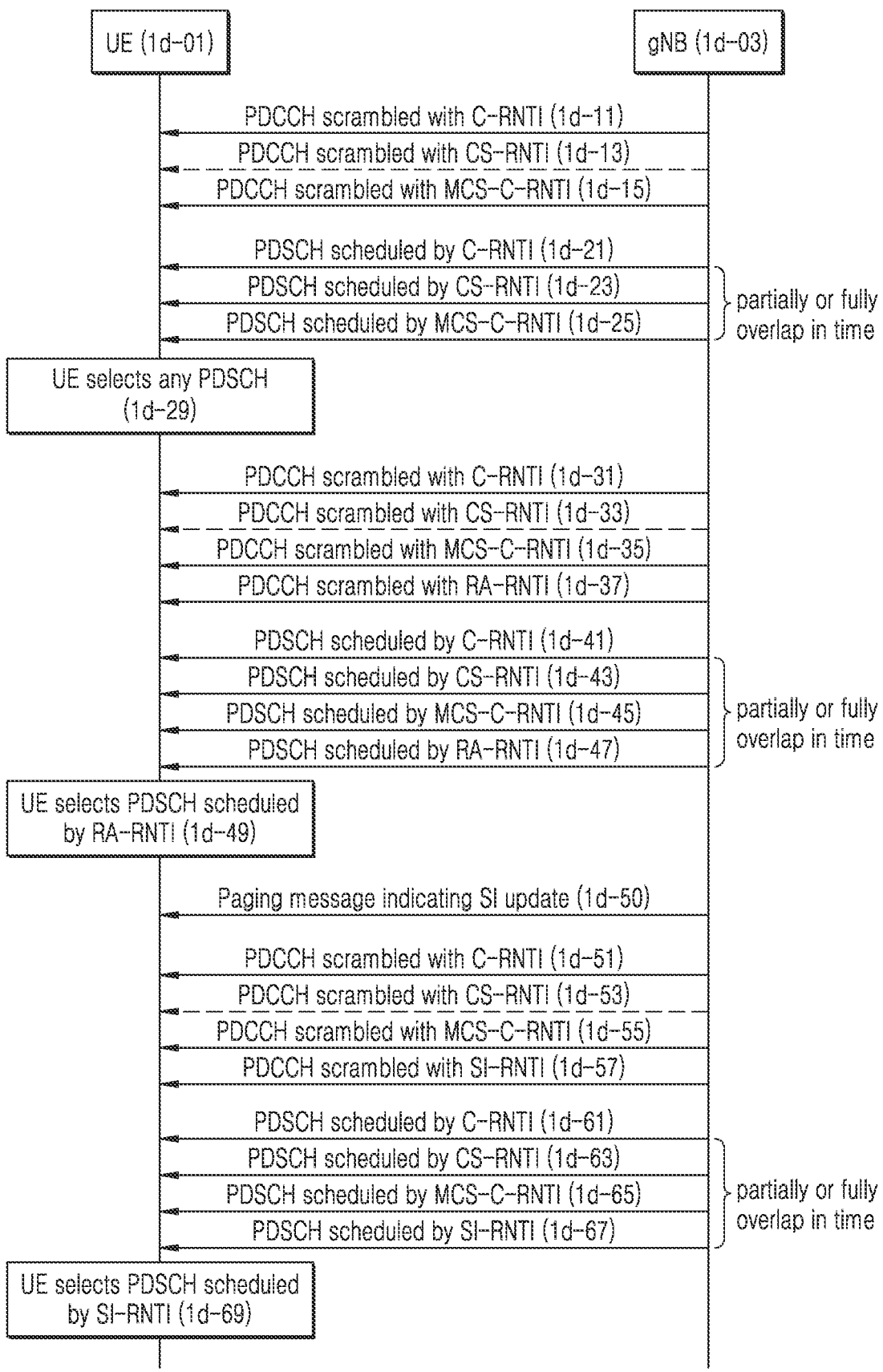
FIG. 1D is a signal flow diagram of another method for communicating data in a wireless communication system according to an embodiment of the disclosure.

FIG. 1D is a signal flow diagram of another method for communicating data in a wireless communication system according to an embodiment of the disclosure.

Referring to FIG. 1D, it is assumed that after a random access procedure is successfully performed between a UE 1d-01 and a base station or gNB 1d-03, and the base station 1d-03 additionally allocates and transmits an MCS-C-RNTI for a UE 1d-01, the UE 1d-01 may receive resource allocation messages (1d-11), (1d-13), (1d-15), (1d-31), (1d-33), (1d-35), (1d-37), (1d-51), (1d-53), (1d-55), and (1d-57) associated with a respective RNTI and data (1d-21), (1d-23), (1d-25), (1d-41), (1d-43), (1d-45), (1d-47), (1d-51), (1d-53), (1d-55), and (1d-57) associated with the respective RNTIs. The RNTIs shown in FIG. 1D will be defined as follows:

configured scheduling-RNTI (CS-RNTI): An RNTI used to allocate a resource to be allocated not every time but once and periodically.

system information-RNTI (SI-RNTI): An RNTI used for the base station 1d-03 to broadcast an SI message to UEs in a cell.

paging-RNTI (P-RNTI): An RNTI used in a paging message to be sent by the base station 1d-03 to the UE 1d-01 when the UE 1d-01 is in an idle mode to inform the UE 1d-01 that there is data for the UE 1d-01 to be transmitted. In an exemplary embodiment, the paging message may further include an indicator to indicate that there is an update of the RNTI associated with the SI.

After the UE 1d-01 receives resource allocation messages (1d-11), (1d-13), (1d-15), (1d-31), (1d-33), (1d-35), (1d-37), (1d-51), (1d-53), (1d-55), the UE 1d-01 may receive data (1d-21), (1d-23), (1d-25), (1d-41), (1d-43), (1d-45), (1d-47), (1d-51), (1d-53), (1d-55), and (1d-57) via a PDSCH resource corresponding to the respective RNTIs. The UE 1d-01 may receive the data (1d-21), (1d-23), (1d-25), (1d-41), (1d-43), (1d-45), (1d-47), (1d-51), (1d-53), (1d-55), and (1d-57) corresponding to the respective RNTIs at the same or different times. When the UE 1d-01 receives data from two or more respective RNTIs at the same time, the UE 1d-01 may identify an order in which to decode the data (1d-21), (1d-23), (1d-25), (1d-41), (1d-43), (1d-45), (1d-47), (1d-51), (1d-53), (1d-55).

Referring to a scenario in which the UE 1d-01 receives resource allocation messages (1d-11), (1d-13), (1d-15), the UE 1d-01 may receive at least a portion of two or more of data (1d-21), (1d-23), and (1d-25) simultaneously. For example, the transmission of some portions or all of the two or more data (1d-21), (1d-23), and (1d-25) may overlap at the same point of time.

The C-RNTI and the MSC-C-RNTI may be allocated to the UE 1d-01 as previously discussed. The CS-RNTI may be separately allocated to the UE 1d-01. Resources allocated with the CS-RNTI may include a resource allocated at a specific transmission time or a resource periodically allocated UE 1d-01.

When at least a portion of the two or more of data (1d-21), (1d-23), and (1d-25), the UE 1d-01 may arbitrarily choose which data (1d-21), (1d-23), and (1d-25) to decode first according to the implementation of the UE. For example, the UE 1d-01 may arbitrarily select to decode any of the PDSCHs associated with the two or more of data (1d-21), (1d-23), and (1d-25) in operation (1d-29). Alternatively, the UE 1d-01 may prioritize data associated with the MCS-C-RNTI such that the data (1d-25) is decoded first.

In exemplary CA embodiment, the UE 1d-01 may perform random access even in the connected state. For example, after a random access procedure is successfully performed with a PCell and/or an SCell, the UE 1d-01 may perform a second random access with another base station (e.g., SCell). Similar to the scenario as described above in connection with FIG. 1C, when the UE 1*d*-01 performs a second random access procedure, the UE 1*d*-01 may receive a second resource allocation message including a second RA-RNTI (e.g., a different RA-RNTI from the RA-RNTI included in RAR (1*c*-13)) in a RAR during the second random access procedure. Accordingly, when the UE 1*d*-01 transmits a second random access preamble to perform random access with a base station (either gNB 1*d*-03 or another gNB/eNB), the UE 1*d*-01 may receive a resource allocation message corresponding to the second RA-RNTI (1*d*-37) in addition to resource allocation messages (1*d*-31), (1*d*-33), and (1*d*-35).

In an exemplary embodiment, the UE 1*d*-01 may not receive data (1*d*-41) and (1*d*-45) via a resource allocated with the C-RNTI or the MCS-C-RNTI even when the resource exists (e.g., the resource is allocated for data to be transmitted to the UE 1*d*-01). Instead, the UE 1*d*-01 may only receive data (1*d*-47) in a location allocated by the resource allocation message including the RA-RNTI.

In another exemplary embodiment, when the UE 1*d*-01 receives at least a portion of data (1*d*-47) and a portion of data (1*d*-41), (1*d*-43), and (1*d*-45), simultaneously, in operation (1*d*-49) the UE 1*d*-01 may select to decode data (1*d*-47) received on the PDSCH associated with RA-RNTI before data (1*d*-41), (1*d*-43), and (1*d*-45) received on any other PDSCH.

Furthermore, as described above, the UE 1*d*-01 may receive a paging message (1*d*-50) from the base station 1*d*-03 when the UE 1*d*-01 is in idle mode. The paging message (1*d*-50) may include an indicator notifying the UE 1*d*-01 that the SI has been updated. Based on the notification that the SI has been updated, the UE 1*d*-01 may monitor for a resource allocation message (1*d*-57) associated with the updated SI based on the SI-RNTI previously allocated for SI information. After the UE 1*d*-01 receives the resource allocation message (1*d*-57), the UE 1*d*-01 may receive the updated SI in data (1*d*-67).

In an exemplary embodiment, even when there is a resource allocated to the UE 1*d*-01 with the C-RNTI, the CS-RNTI, or the MCS-RNTI, the UE 1*d*-01 may not receive data via the allocated resource but receive the updated SI by receiving data (1*d*-67) in a location allocated by the resource allocation message including an SI-RNTI.

In another exemplary embodiment, when the UE 1*d*-01 receives at least a portion of data (1*d*-67) and a portion of data (1*d*-61), (1*d*-63), and (1*d*-65), simultaneously, in operation (1*d*-69) the UE 1*d*-01 may select to decode data (1*d*-67) received on the PDSCH associated with SI-RNTI before data (1*d*-41), (1*d*-43), and (1*d*-45) received on any other PDSCH in order to prioritize decoding the updated SI information.

Figure 1E:
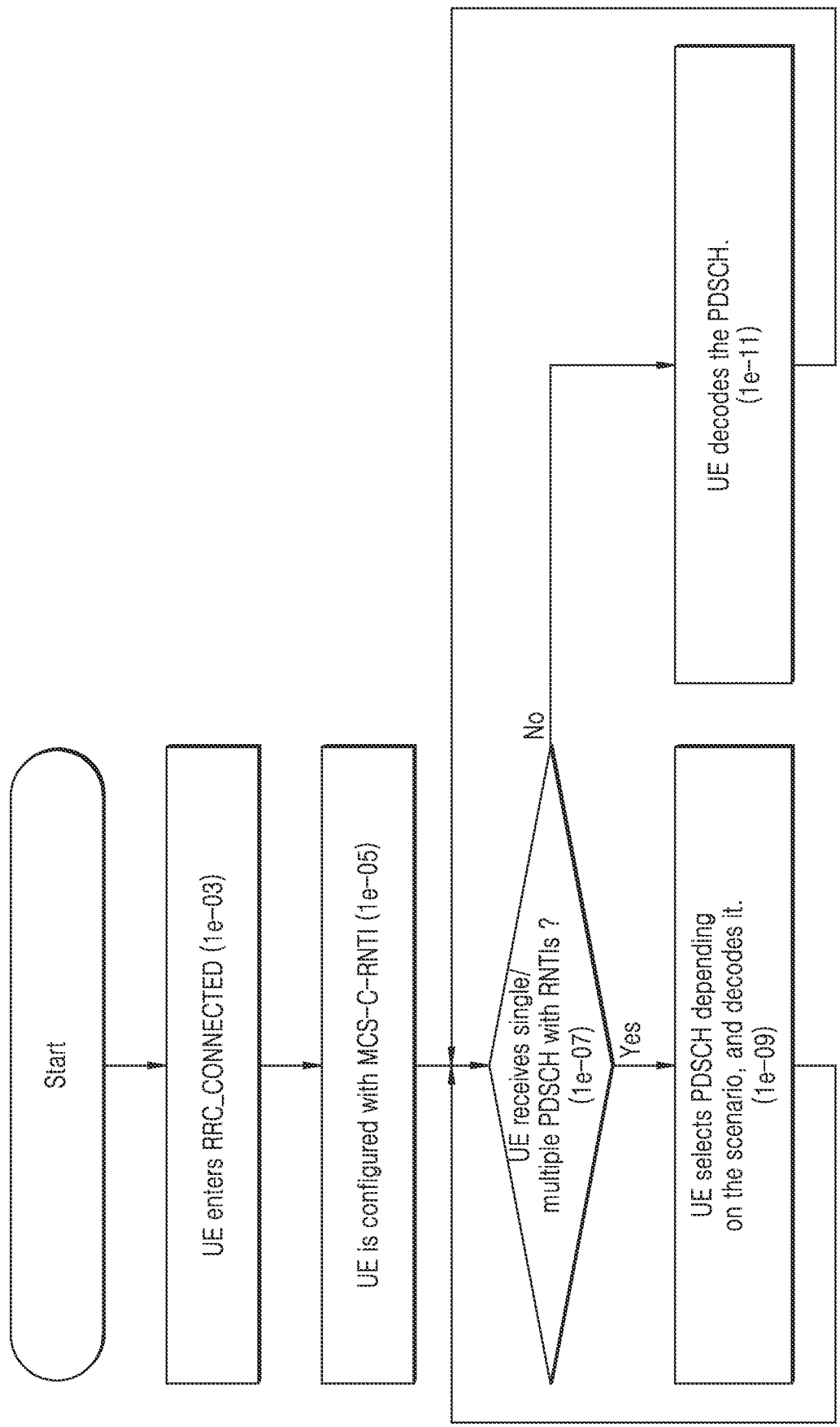
FIG. 1E is a flowchart illustrating another method of communicating data in a wireless communication system according to an embodiment of the disclosure.

FIG. 1E is a flowchart illustrating a procedure for a UE to receive data when the UE is allocated an additional identifier according to an embodiment of the disclosure.

Referring to FIG. 1E, in an embodiment of the disclosure, a UE may enter into a connected state in operation (1*e*-03). The UE may be additionally allocated an MCS-C-RNTI from the base station in operation (1*e*-05).

The UE may determine whether it receives data on all or some of downlink resources and whether the data received on the downlink resources overlap each other at a point in time in operation (1*e*-07).

When the UE has received data and there is no overlapping data, the UE may decode the data in operation (1*e*-11).

On the other hand, when the UE determines that there is overlapping data, the UE may choose which data to decode in operation (1*e*-09), as will be described below.

The UE may simultaneously receive a resource allocated with a C-RNTI and a resource allocated with a CS-RNTI, simultaneously receive the resource allocated with the CS-RNTI and a resource allocated with an MCS-C-RNTI, or simultaneously receive the resource allocated with the C-RNTI and the resource allocated with the MCS-C-RNTI. Alternatively, the UE may simultaneously receive the resource allocated with the C-RNTI, the resource allocated with the CS-RNTI, and the resource allocated with the MCS-C-RNTI. The UE may arbitrarily choose an allocated resource according to the implementation of the UE, or determine data sent with the MCS-C-RNTI to be important and decode the data first.

Furthermore, when the UE transmits a random access preamble to perform random access and receives the resource allocation message including the RA-RNTI for RAR reception, the UE may not receive the resource allocated with the C-RNTI or the MCS-C-RNTI even when the resource exists but receive the RAR by receiving data in a location allocated by the resource allocation message including the RA-RNTI.

Moreover, when the UE receives a paging message indicating that the SI has been updated, and even when there is a resource allocated with the C-RNTI, the CS-RNTI, or the MCS-RNTI, the UE may not receive the resource but receive the updated SI by receiving data in a location allocated by the resource allocation message including an SI-RNTI.

Figure 1F:
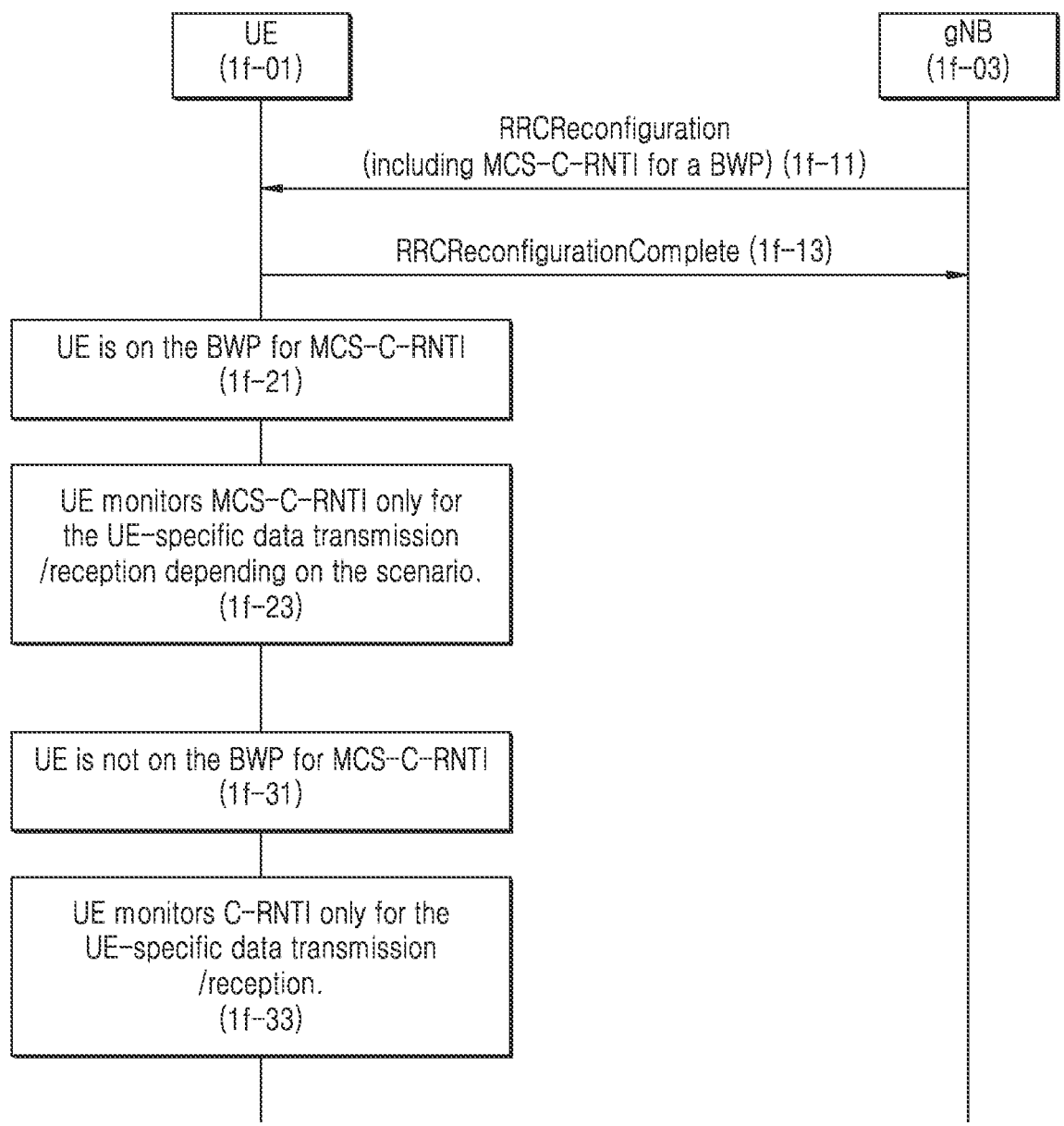
FIG. 1F is a signal diagram of another method of communicating data in a wireless communication system according to an embodiment of the disclosure.

FIG. 1F is a signal diagram of another method of communicating data in a wireless communication system according to an embodiment of the disclosure.

Referring to FIG. 1F, in an embodiment of the disclosure, after a random access procedure is successfully performed, a UE 1*f*-01 may be allocated the aforementioned MCS-C-RNTI for a particular BWP. The MCS-C-RNTI may be included in an RRC Reconfiguration message (1*f*-11). In response to receiving the RRC Reconfiguration message (1*f*-11), the UE may transmit an RRC reconfiguration complete message (1*f*-13) to a base station or gNB 1*f*-03. Hence, when the gNB 1*f*-03 sets up each BWP for the UE 1*f*-01, the gNB 1*f*-03 may signal whether to the MCS-C-RNTI or the C-RNTI is allocated for the BWP.

The UE may be allocated resources associated with the MCS-C-RNTI within the BWP in (1*f*-21). When the UE 1*f*-01 is in a BWP available for data transmission or reception with the MCS-C-RNTI (or when the BWP available for data transmission or reception with the MCS-C-RNTI is activated for the UE), the UE 1*f*-01 may not monitor whether the C-RNTI is included but instead monitor whether the MCS-C-RNTI is included to transmit or receive data within the BWP depending on the scenario in 1*f*-23. For example, the UE 1*f*-01 may only monitor resources associated with the MCS-C-RNTI within the BWP when a received data length is shorter than a certain length or when subcarrier spacing of the BWP is larger than a certain size. In this scenario, the UE 1*f*-01 may determine that the BWP is allocated to the UE 1*f*-01 for ultra-reliable low latency data communication and when ultra-reliable low latency data communication is designated as a priority transmission, the UE 1*f*-01 may only monitor PDSCHs for data associated with the MCS-C-RNTI.

In (1*f*-31), the UE 1*f*-01 may be allocated resources within the BWP but the resources are not associated with data transmission or reception with the MCS-C-RNTI (or when the BWP available for data transmission or reception with the MCS-C-RNTI is not activated for the UE) (1*f*-31). The UE 1*f*-01 may not monitor whether data associated with the MCS-C-RNTI is received in the BWP but instead monitor whether data associated with the C-RNTI is received within the BWP in (1*f*-33) for data transmission/reception information specific to the UE 1*f*-01.

Figure 1G:
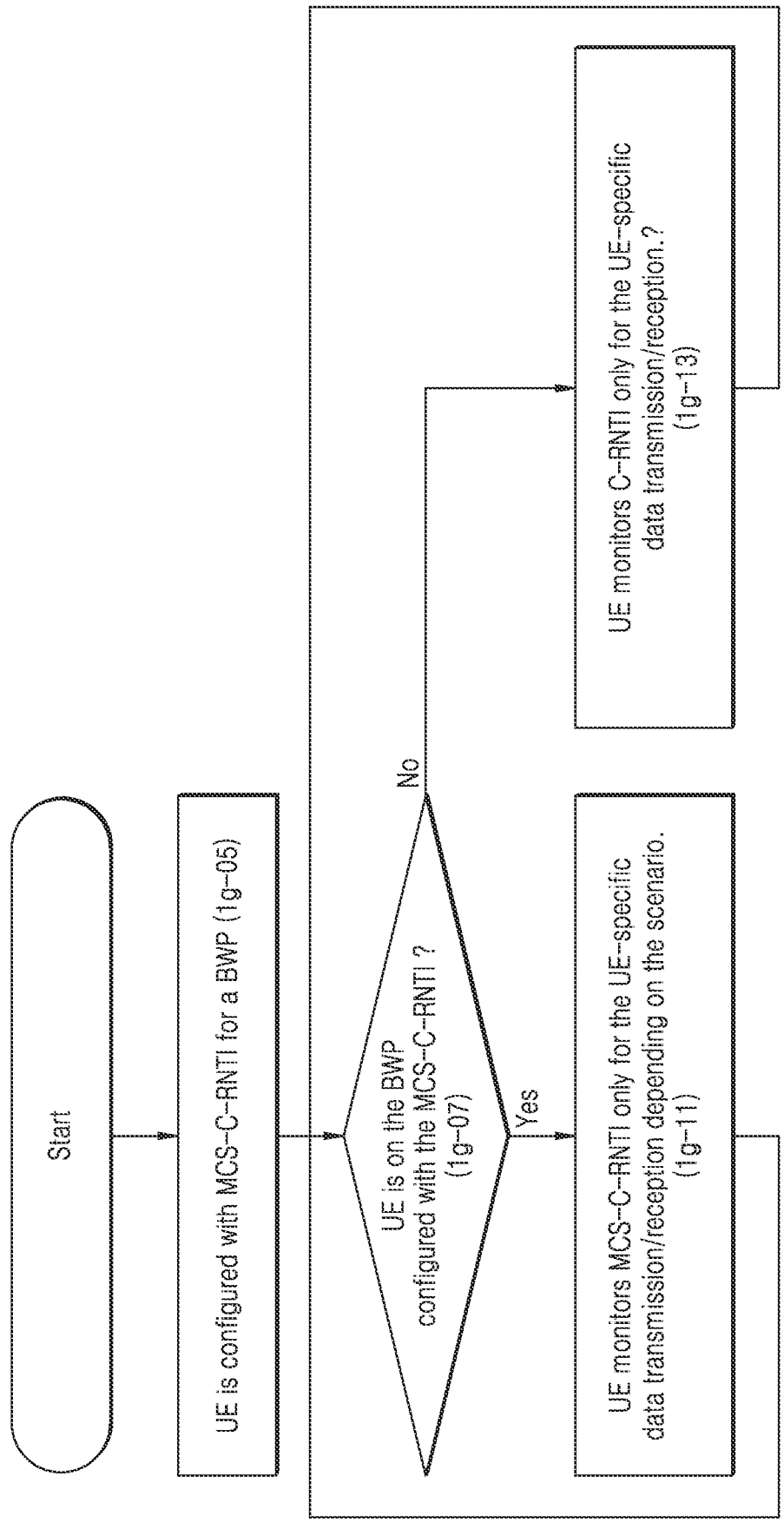
FIG. 1G is a flowchart illustrating another method of communicating data in a wireless communication system according to an embodiment of the disclosure.

FIG. 1G is a flowchart illustrating another method of communicating data in a wireless communication system according to an embodiment of the disclosure.

Referring to FIG. 1G, in an embodiment of the disclosure, after a random access procedure is successfully performed, a UE may be configured with the aforementioned MCS-C-RNTI for a particular BWP, as described above in connection with FIG. 1F. When a base station allocates each BWP to a UE, the base station may determine whether to allocate a MCS-C-RNTI or a C-RNTI to the UE for communication within the BWP. In operation (1*g*-05), the UE may be configured such that the UE is allocated a MSC-C-RNTI and the BWP is activated for the UE.

In operation (1*g*-07), it may be determined whether the UE is allocated resources to receive data associated with the MSC-C-RNTI within the BWP. When the UE is in a BWP available for data transmission or reception with the MCS-C-RNTI (or when the BWP available for data transmission or reception with the MCS-C-RNTI is activated for the UE), the UE may not monitor whether data associated with the C-RNTI is included but instead monitor whether data associated with the MCS-C-RNTI is transmitted or received in operation (1*g*-11).

Alternatively, when it is determined that the UE is allocated resources to receive data associated with the MSC-C-RNTI, the UE may monitor whether data associated with the C-RNTI is received in the BWP in operation (1*g*-13).

Figure 1H:
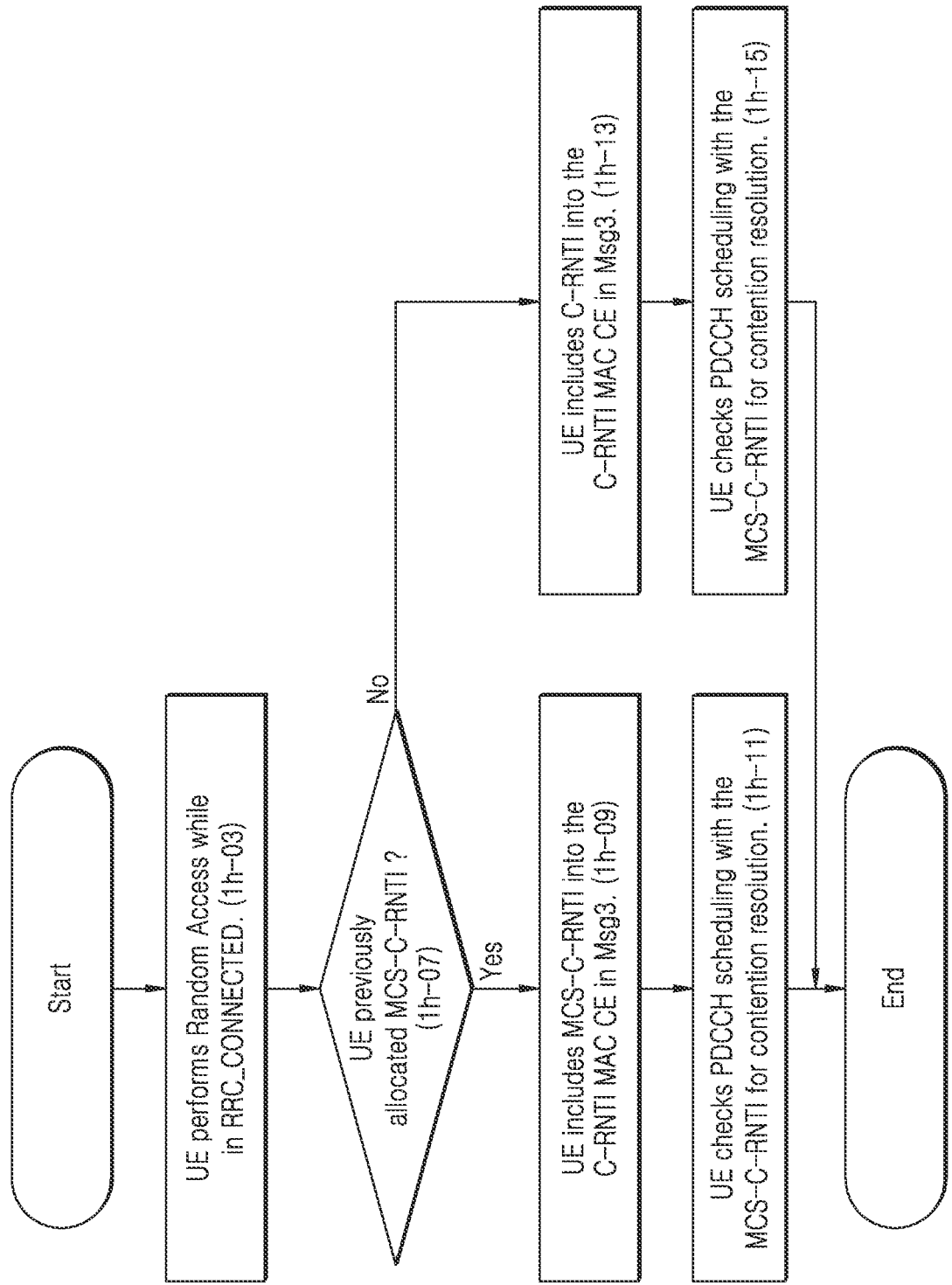
FIG. 1H is a flowchart illustrating another method of communicating data in a wireless communication system according to an embodiment of the disclosure.

FIG. 1H is a flowchart illustrating another method of communicating data in a wireless communication system according to an embodiment of the disclosure.

Referring to FIG. 1H, in an embodiment of the disclosure, after a first random access procedure is successfully performed and a UE is in a connected state, the UE may perform a second random access procedure in operation (1*h*-03). In operation (1*h*-07), it may be determined whether the UE was previously allocated an MCS-C-RNTI.

Based on the second random access procedure, the UE may transmit a second preamble and in return, receive a second RAR message in response to the second preamble. Subsequently, when the UE transmits Msg3 (RRC Connection Request message), it may transmit a previously allocated RNTI of the UE in the Msg3 because the UE has already been in the connected state. Hence, the UE that is currently performing the random access procedure may inform the base station that the UE has already been allocated the RNTI.

When it is determined that the UE was previously allocated a MCS-C-RNTI, the UE may include the previously allocated MCS-C-RNTI in a MAC layer message (e.g., C-RNTI MAC CE) in Msg3 of the second random access procedure in operation (1*h*-09). For example, when the UE is in a BWP available for data transmission or reception with the MCS-C-RNTI (or when the BWP available for data transmission or reception with the MCS-C-RNTI is activated for the UE) (1*h*-07), the UE may include the MCS-C-RNTI in the C-RNTI MAC CE when transmitting the RNTI in the Msg3.

Subsequently, the UE may monitor the PDCCH using the MCS-C-RNTI to determine whether the contention resolution message of the second random access procedure is received from the base station in operation (1*h*-11). The UE may monitor the PDCCH to determine whether the Msg3 was successfully received by the base station. When receiving an uplink resource allocation message including the MCS-C-RNTI sent from a PCell of the base station, the UE may determine that the Msg3 has been properly sent and the second random access procedure may be successfully completed.

When it is determined that the UE was not previously allocated a MCS-C-RNTI, the UE may include the previously allocated C-RNTI in the C-RNTI MAC CE in Msg3 in operation (1*h*-13). In an exemplary embodiment, the previously allocated C-RNTI included in the Msg3 may be the TC-RNTI received in the first random access procedure that was promoted to C-RNTI after the first random access procedure was successfully completed or another C-RNTI that was allocated to the UE after the first random access procedure was successful.

Subsequently, the UE may monitor the PDCCH using the C-RNTI to determine whether the contention resolution message of the second random access procedure is received from the base station in operation (1*h*-15). The UE may monitor the PDCCH to determine whether the Msg3 was successfully received by the base station. Having received an uplink resource allocation message including the C-RNTI sent from a PCell of the base station, the UE may determine that the Msg3 has been properly sent and complete the random access procedure.

Figure 1I:
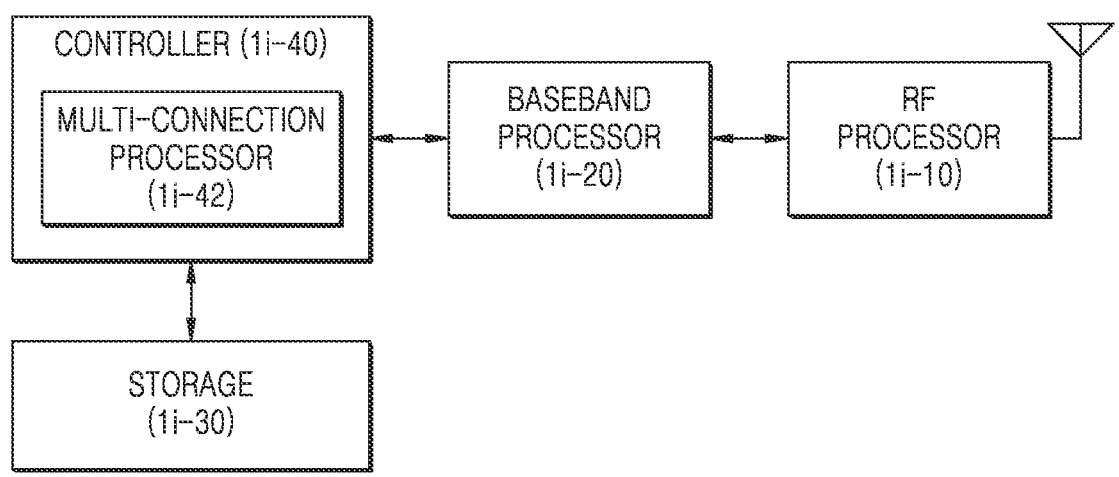
FIG. 1I is a block diagram of a UE in a wireless communication system according to an embodiment of the disclosure.

FIG. 1I is a block diagram of a UE in a wireless communication system according to an embodiment of the disclosure.

Referring to FIG. 1I, in the embodiment of the disclosure, the UE may include a radio frequency (RF) processor 1*i*-10, a baseband processor 1*i*-20, a storage 1*i*-30, and a controller 1*i*-40.

The RF processor 1*i*-10 may perform functions, such as band conversion, amplification, etc., of a signal to transmit or receive the signal on a radio channel Specifically, the RF processor 1*i*-10 may up-convert a baseband signal provided from the baseband processor 1*i*-20 to an RF band signal for transmission through an antenna, and down-convert an RF band signal received through the antenna to a baseband signal. For example, the RF processor 1*i*-10 may include a transmission filter, a reception filter, an amplifier, a mixer, an oscillator, a digital to analog converter (DAC), an analog to digital converter (ADC), etc. Although a single antenna is shown in FIG. 1I, the UE may be equipped with multiple antennas. The RF processor 1*i*-10 may also include multiple RF chains. Furthermore, the RF processor 1*i*-10 may perform beamforming. For beamforming, the RF processor 1*i*-10 may control the phase and amplitude of each signal to be sent or received through the multiple antennas or antenna elements.

The baseband processor 1*i*-20 may perform conversion between a baseband signal and a bit sequence based on the physical layer standard of the system. For example, for data transmission, the baseband processor 1*i*-20 may generate complex symbols by encoding and modulating a bit sequence for transmission. Furthermore, for data reception, the baseband processor 1*i*-20 may reconstruct a received bit sequence by demodulating and decoding the baseband signal provided from the RF processor 1*i*-10. For example, in a case of conforming to an orthogonal frequency divisional multiplexing (OFDM) method, for data transmission, the baseband processor 1*i*-20 generates complex symbols by encoding and modulating a bit sequence for transmission, map the complex symbols to subcarriers, and perform an inverse fast Fourier transform (IFFT) operation and cyclic prefix (CP) insertion to construct OFDM symbols. Furthermore, for data reception, the baseband processor 1*i*-20 may divide a baseband signal provided from the RF processor 1*i*-10 into OFDM symbol units, reconstruct the signals mapped to the subcarriers through a fast Fourier transform (FFT) operation and then reconstruct a received bit sequence through demodulation and decoding.

The baseband processor 1*i*-20 and the RF processor 1*i*-10 may be used to transmit or receive signals as described above. Hence, the baseband processor 1*i*-20 and the RF processor 1*i*-10 may be referred to as a transmitter, a receiver, a transceiver, or a communicator. Further, at least one of the baseband processor 1*i*-20 or the RF processor 1*i*-10 may include many different communication modules to support many different radio access technologies. Furthermore, at least one of the baseband processor 1*i*-20 or the RF processor 1*i*-10 may include different communication modules to process different frequency band signals. For example, the different radio access technologies may include a Wireless Local Area Network (WLAN), e.g., the IEEE 802.11, a cellular network, e.g., LTE, etc. Moreover, the different frequency bands may include a super high frequency (SHF) band, e.g., 2.5 GHz or 5 GHz, and an mmwave band, e.g., 60 GHz.

The storage 1*i*-30 may store a basic program for operation of the UE, an application program, data like settings information, and the like. Especially, the storage 1*i*-30 may store information relating to a WLAN node that performs wireless communication using a WLAN access technology. The storage 1*i*-30 may also provide stored data at the request of the controller 1*i*-40.

The controller 1*i*-40 may control general operations of the UE. For example, the controller 1*i*-40 may control the baseband processor 1*i*-20 and the RF processor 1*i*-10 for signal transmission or reception. The controller 1*i*-40 may also record or read data onto or from the storage 1*i*-30. For this, the controller 1*i*-40 may include at least one processor. For example, the controller 1*i*-40 may include a communication processor (CP) for controlling communication and an application processor (AP) for controlling a higher layer, such as an application program. In an embodiment of the disclosure, the controller 1*i*-40 may include a multi-connection processor 1*i*-42 for performing a process for operation in a multi-connection mode. For example, the controller 1*i*-40 may control the UE to perform an operation procedure as shown in FIG. 1C, 1D, 1E, 1F, 1G, or 1H.

In an embodiment of the disclosure, when the UE receives a plurality of resource allocations with different RNTIs, the controller 1*i*-40 may choose which one to receive to prevent unnecessary reception of resources allocated with the other RNTIs.

The disclosure relates to a communication method between a base station and a UE in a wireless communication when, for example, a plurality of identifiers are allocated for the UE in different schemes in the 3GPP 5G NR technology.

According to the disclosure, the UE may receive an identifier additionally allocated for a required band, thereby saving power consumption.

Figure 2A:
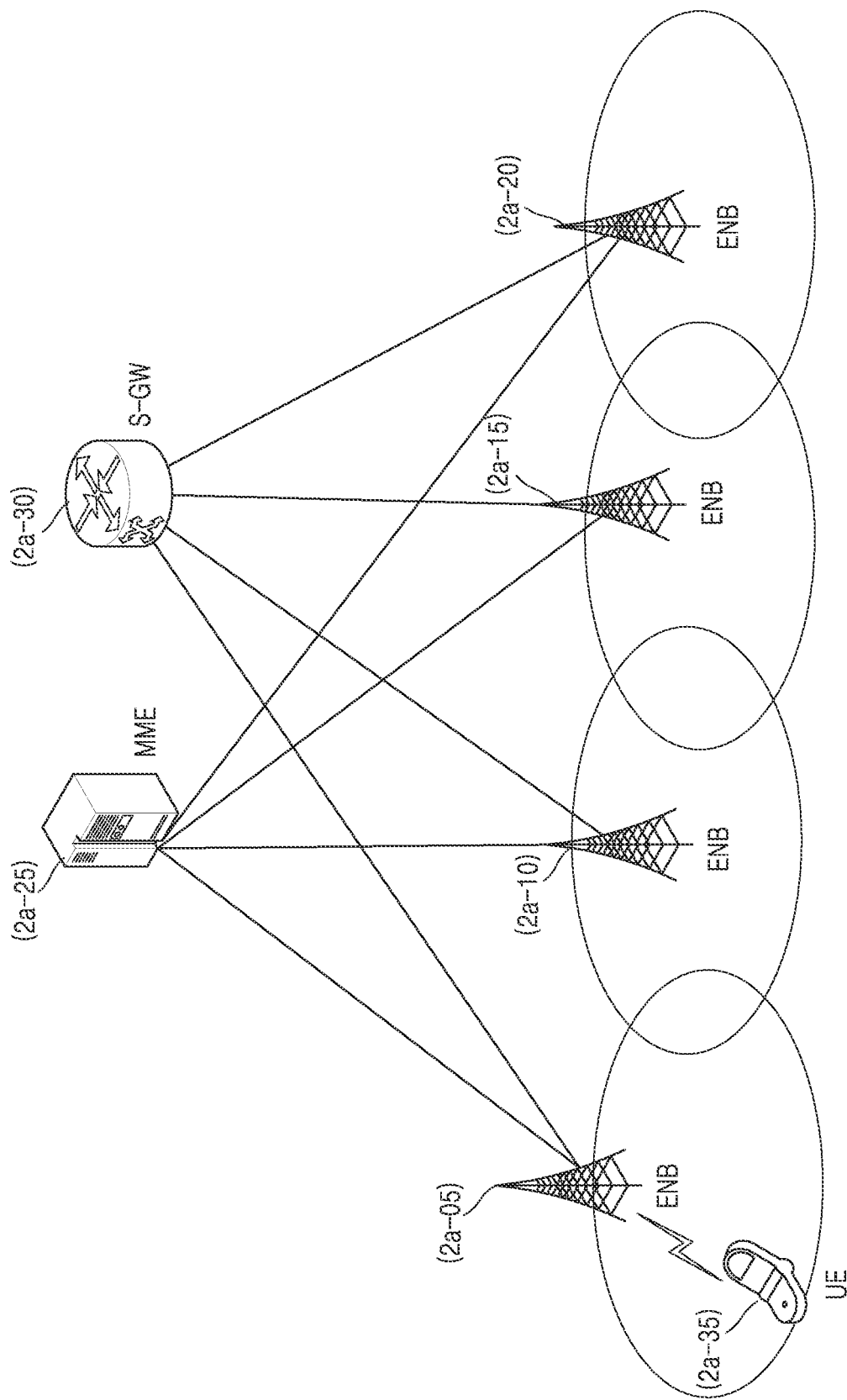
FIG. 2A is a network diagram of an LTE system according to an embodiment of the disclosure.

FIG. 2A is a network diagram of an LTE system according to an embodiment of the disclosure.

The structure of an LTE system as described herein may also be applied to an NR system.

Referring to FIG. 2A, a wireless communication system may include a number of base stations (also referred to as eNBs) 2*a*-05, 2*a*-10, 2*a*-15, and 2*a*-20, a mobility management entity (MME) 2*a*-25, and a serving gateway (S-GW) 2*a*-30. A UE or a terminal 2*a*-35 may access an external network via the base station 2*a*-05, 2*a*-10, 2*a*-15, or 2*a*-20, and the S-GW 2*a*-30.

The base stations 2*a*-05, 2*a*-10, 2*a*-15, and 2*a*-20 are access nodes of a communication network to enable UEs to wirelessly access one or more communication networks. The base stations 2*a*-05, 2*a*-10, 2*a*-15, and 2*a*-20 may collect status information, such as buffer states of UEs, available transmission power states, channel conditions, etc., to provide service traffic to the UE 2*a*-35, and support connection between the UEs 2*a*-35 and a CN including the MME 2*a*-25 and the S-GW 1*a*-30 by scheduling resources for communication between the UE 2*a*-35 and one or more base stations 2*a*-05, 2*a*-10, 2*a*-15, and 2*a*-20. The MME 2*a*-25 is a network device responsible for various control operations as well as mobility management functionality for the UE 2*a*-35, and may be connected to or in communication with one or more of the base stations 2*a*-05, 2*a*-10, 2*a*-15, and 2*a*-20. The S-GW 2*a*-30 is a network device for providing data bearer. The S-GW 2*a*-30 may further perform authentication of a UE accessing the network, bearer management, etc., and process packets to be sent to the UE 2*a*-35 via the base stations 2*a*-05, 2*a*-10, 2*a*-15, or 2*a*-20 or packets received from the UE 2*a*-35 via the base station 2*a*-05, 2*a*-10, 2*a*-15, or 2*a*-20.

Figure 2B:
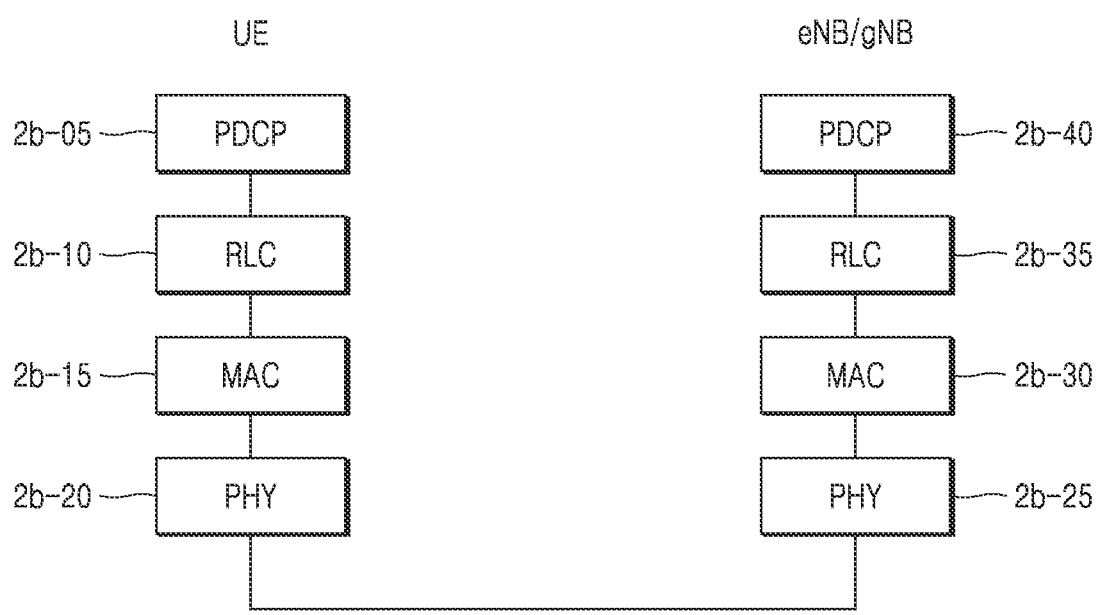
FIG. 2B is a radio protocol architecture for an LTE or NR system according to an embodiment of the disclosure.

FIG. 2B is a radio protocol architecture for an LTE or NR system to be referenced for explanation according to an embodiment of the disclosure.

Referring to FIG. 2B, the radio protocol for an LTE system may include, for each UE and base station (eNB/gNB), a PDCP 2*b*-05 or 2*b*-40, an RLC 2*b*-10 or 2*b*-35, and an MAC 2*b*-15 or 2*b*-30.

The PDCP 2*b*-05 or 2*b*-40 may perform an operation, e.g., IP header compression/decompression. The RLC 2*b*-10 or 2*b*-35 may reconfigure a PDU into a suitable size. The MAC 2*b*-15 or 2*b*-30 may be connected to a number of RLC layer devices configured in a single UE, for multiplexing RLC PDUs to an MAC PDU and demultiplexing RLC PDUs from an MAC PDU.

A physical layer PHY 2*b*-20 or 2*b*-25 may perform channel coding and modulation on upper layer data, generate a signal including the data mapped to OFDM symbols, and transmit the signal including the OFDM symbols on a radio channel, or may demodulate a signal including OFDM symbols received on a radio channel, perform channel decoding, and send the resulting data to an upper layer. Furthermore, the PHY 2*b*-20 or 2*b*-25 may use HARQ for additional error correction, such that a receiving device may transmit an indication as to whether a packet has been received from a transmitting device in one bit. This may be called HARQ ACK/NACK information or messages. Downlink HARQ ACK/NACK information for uplink data transmission is sent on a PHICH for the LTE system, and whether retransmission or new transmission is required may be determined based on scheduling information for the corresponding UE on a PDCCH, on which downlink/uplink resource allocations are sent for the NR. This is because an asynchronous HARQ is applied to the NR system. Uplink HARQ ACK/NACK information for downlink data transmission may be sent on a PUCCH or PUSCH.

In the LTE system, a cell of a base station that uses a primary carrier is called a PCell and a cell of a base station that uses a secondary carrier is called an SCell.

As will be described below, a PUCCH is commonly used for uplink transmission in the PCell, but when the UE is supported, the base station may allow the UE to use the PUCCH in additional transmission to an S Cell, in which case the SCell is called a PUCCH S Cell.

Although not shown, there are RRC layers above the PDCP layers of the UE and the base station, and the RRC layers may exchange control messages related to access and measurement for radio resource control.

The PHY 2b-20 and 2b-25 may include one or multiple frequencies/carriers when CA is implemented. A technology that enables a single base station to assign and use multiple frequencies simultaneously is called CA. Unlike a single carrier being used for communication between a UE and a base station (E-UTRAN NodeB, eNB), CA may use a primary carrier and one or multiple secondary carriers, thereby increasing the amount of data transmission by the number of secondary carriers.

A technology of expanding the CA capability to two eNBs may be referred to as a dual connectivity (DC) technology. In the DC technology, the UE may be simultaneously connected to a master eNB (MeNB) and a secondary eNB (SeNB) and may use both of them.

Cells belonging to the MeNB may be called a master cell group (MCG), and cells belonging to the SeNB may be called a secondary cell group (SCG). Each cell group may have a representative cell. The representative cell of the MCG may be called a PCell, and the representative cell of the SCG may be called a primary secondary cell (PSCell). When the NR is used, the MCG is used for LTE and the SCG is used for the NR, allowing the UE to use both LTE and NR at the same time.

Furthermore, a concept of BWPs may be introduced by dividing up a wide frequency bandwidth. For example, when the UE uses a single serving cell (i.e., there is only a PCell), the single serving cell may be divided up to operate multiple BWPs. In this case, one or more of the multiple BWPs are activated to transmit or receive data.

Figure 2C:
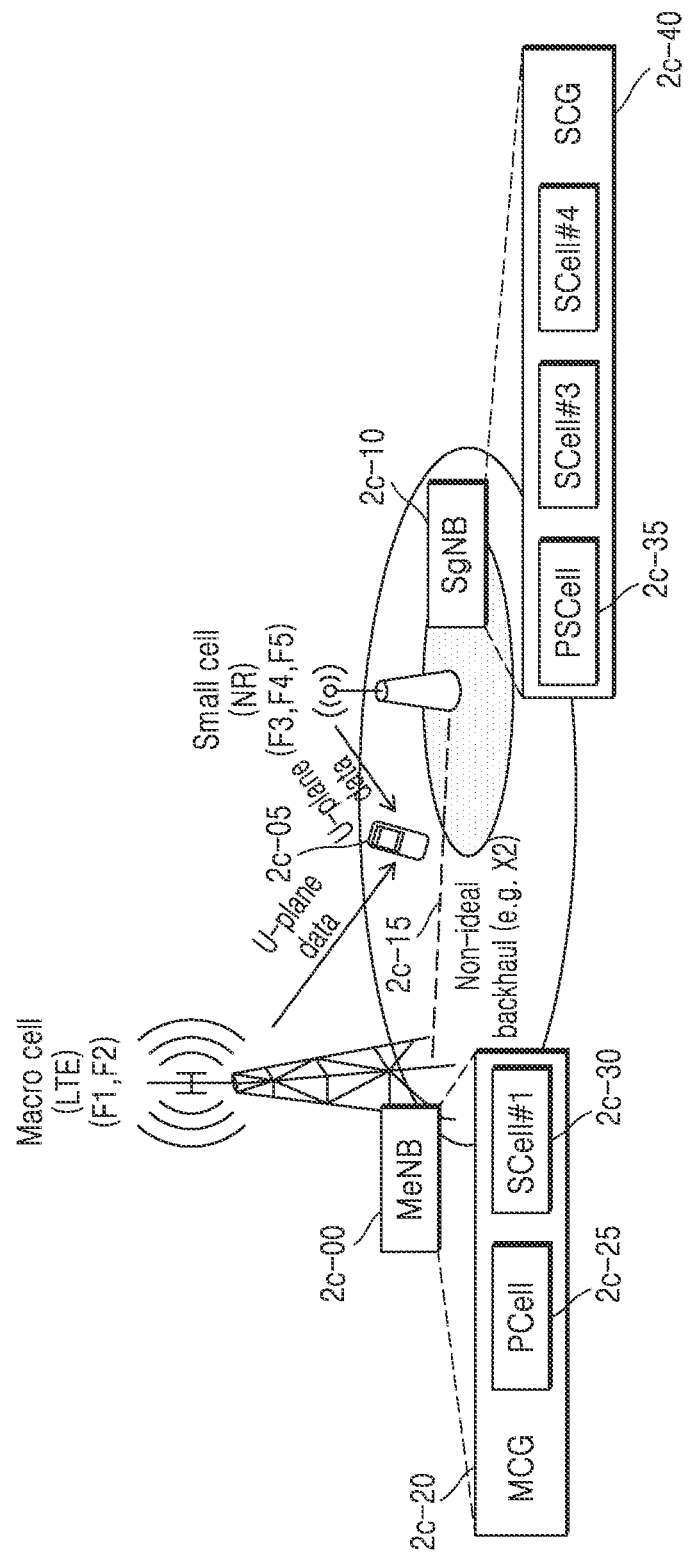
FIG. 2C is a network diagram of a wireless communication system implementing dual connectivity (DC) according to an embodiment of the disclosure.

FIG. 2C is a network diagram of a wireless communication system implementing a DC technology according to an embodiment of the disclosure.

Referring to FIG. 2C, using the DC technology, a UE may be connected to two base stations at the same time to use them simultaneously. As shown in FIG. 2C, a UE 2c-05 may be simultaneously connected to a macro base station 2c-00 that uses the LTE technology and a small cell base station 2c-10 that uses the NR technology to transmit or receive data. This may be called E-UTRAN-NR dual connectivity (EN-DC). The macro base station 2c-00 may be referred to as an MeNB. The small cell base station may be referred to as a secondary 5G nodeB (SgNB).

There may be many small cells in the service area of the MeNB. The MeNB may be connected to the SgNBs over a wired backhaul network 2c-15. A set of serving cells provided from the MeNB may be called an MCG 2c-20. A serving cell in the MCG may be a PCell 2c-25 having all the functions, such as connection establishment, connection re-establishment, handover, etc., which are performed by an existing cell. Furthermore, in the PCell, an uplink control channel may include a PUCCH. Serving cells other than the PCell may be SCells 2c-30.

Although the MeNB may provide one Scell and the SgNB may provide three SCells in the embodiment of the disclosure, the disclosure is not limited thereto. A set of serving cells provided by the SgNB may be called an SCG 2c-40. The MeNB may give the SgNB an instruction to add, change, or remove serving cells that the SgNB provides, when the UE transmits or receives data from the two base stations. To give such an instruction, the MeNB may configure the UE to measure a serving cell and the adjacent cells. The UE may have to report a result of the measurement to the MeNB according to the configuration information. In order for the SgNB to efficiently transmit or receive data to the UE, a serving cell that plays a similar role to the PCell of the MCG is required, and the serving cell may be referred to as a primary SCell (PSCell) in the disclosure (2c-35). The PSCell is designated to be one of the serving cells of the SCG, and is characterized by having an uplink control channel PUCCH. The PUCCH may be used by the UE to transmit HARQ ACK/NACK information, channel status information (CSI) information, a scheduling request (SR), etc., to the base station.

Figure 2D:
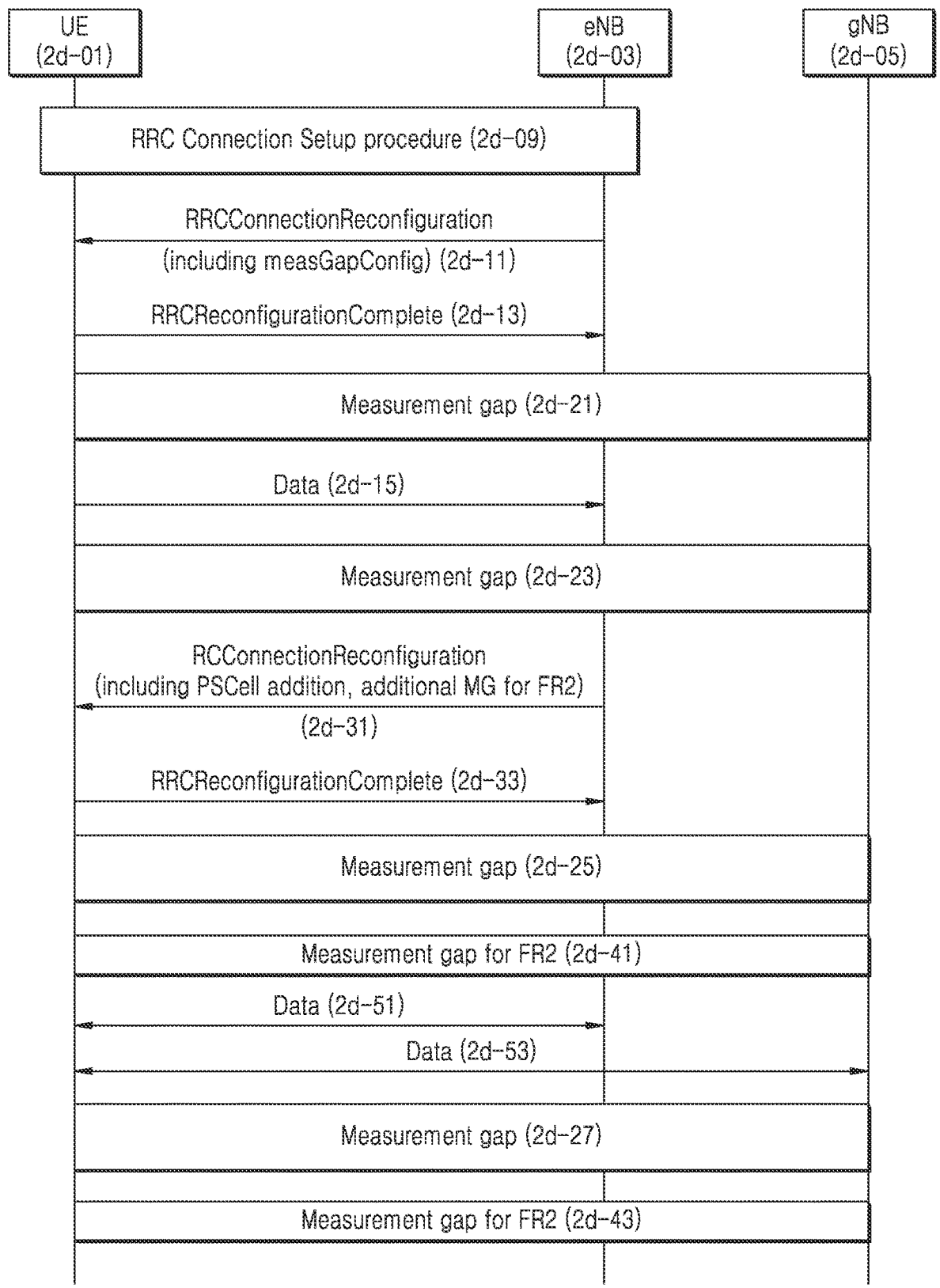
FIG. 2D is a signal diagram illustrating another method for communicating data in a wireless communication system according to an embodiment of the disclosure.

FIG. 2D is a signal diagram illustrating another method for communicating data in a wireless communication system according to an embodiment of the disclosure.

Referring to FIG. 2D, in the embodiment of the disclosure, a UE 2d-01 has been in an idle (RRC_IDLE) state and then initiates an RRC connection setup procedure (2d-09) with the base station (e.g., eNB 2d-03). During the connection setup procedure (2d-09), the UE 2d-01 may perform a first random access procedure with the eNB 2d-03. For example, in the first random access procedure, the UE 2d-01 may transmit a preamble to the eNB 2d-03, in return, receive a response (e.g., a random access response RAR or Msg2), and then transmit an RRC connection request message of the RRC layer to the eNB 2d-03. The RRC connection request message may be different depending on what time the UE performs random access, and all the different messages to be sent in this operation may be collectively called the Msg3.

Subsequently, the UE 2d-01 monitors whether the Msg3 message was successfully received by the eNB (2d-03) based on a message sent from the eNB 2d-03, the message being called Msg4. In an exemplary embodiment, the eNB 2d-03 may transmit an RRC connection setup message to the UE 2d-01 as Msg4, and then the UE 2d-01 transmits an RRC connection setup complete message to complete the connection setup procedure (e.g., first random access procedure).

After the first random access procedure is successfully performed, the UE 2d-01 may receive an RRCConnectionReconfiguration message (2d-11). The RRCConnectionReconfiguration message (2d-11) may include measurement configuration information from the eNB 2d-03 for performing a handover or for initiating an additional connection to an adjacent LTE cell or NR cell. The measurement configuration information may include detailed information about a condition under which a measurement of a frequency is reported, and may additionally include information about a measurement gap associated with the eNB 2d-03 at which the UE 2d-01 measures another frequency. Once the measurement gap associated with the eNB 2d-03 is identified for the UE 2d-01, the UE 2d-01 may be allocated the periodic measurement gap 2d-21, 2d-23, 2d-25, and 2d-27 according to the measurement configuration information.

During a measurement gap 2d-21, 2d-23, 2d-25, 2d-27, the UE 2d-01 may not perform the following operations with the LTE base station 2d-03 in order to measure the frequencies that the UE is configured to measure:

PUCCH transmission (HARQ ACK/NACK, SR, CSI)
SRS transmission
PDCCH monitoring and data reception. However, in a case that the UE needs to receive an RAR or check whether the Msg3 transmission is successful, the UE performs PDCCH monitoring and data reception.
data transmission. However, in an occasion when the random access is performed, transmission of Msg3 in the random access needs to be performed.

Between each measurement gap 2d-21, 2d-23, 2d-25, 2d-27, the UE may transmit or receive data with the base station, 2d-03 in operations (2d-15) and (2d-53).

Subsequently, the base station 2d-03 may transmit information associated with an NR cell for the UE 2d-01 to establish communication. For example, when the UE 2d-01 is configured for a multi-connection mode, an NR base station 2d-05 may be identified for the UE 2d-01 to establish communication based on the result of measurement of adjacent cells from the UE 2d-01. In order to instruct the UE 2d-01 to initiate establishing communication with gNB 2d-05, the base station 2d-03 may add a PSCell for the UE 2d-01 using an RRCConnectionReconfiguration message (2d-31). The RRCConnectionReconfiguration message (2d-31) may also include detailed information associated with establishing communication with the gNB 2d-05, such as an additional measurement frequency and additional measurement gap (e.g., a measurement gap different from the measurement gap associated with the eNB 2d-03). In an alternative embodiment, the detailed information may be received from the NR base station 2d-05. In response to receiving the RRCConnectionReconfiguration message (2d-31), the UE 2d-01 may transmit an RRC reconfiguration complete message (2d-33) to the eNB 2d-03.

In the meantime, in NR, frequencies below 6 GHz may be called frequency range 1 (FR1) and frequencies above 6 GHz may be called frequency range 2 (FR2). Hence, when a measurement gap associated with the NR base station 2d-05 is identified, the detailed information associated with establishing communication with the gNB 2d-05 may include information indicating whether the measurement gap associated with the NR base station 2d-05 is for FR1 or FR2. When gNB 2d-05 is associated with FR2, the UE 2d-01 may perform measurements in the measurement gap (2d-41 and 2d-43) for the FR2 frequency measurement.

During measurement gaps (2d-41 and 2d-43), the UE 2d-01 may not perform the following operations in order to measure the frequency in the frequency range (the FR2 in this example) set for measurement by the NR base station 2d-05:

PUCCH transmission (HARQ ACK/NACK, SR, CSI) in a serving cell of the UE that operates in the FR2

CSI information (including CSI information for semi-persistent transmission) transmission on a PUSCH in a serving cell of the UE that operates in the FR2.

SRS transmission in a serving cell of the UE that operates in the FR2.

PDCCH monitoring and data reception in a serving cell of the UE that operates in the FR2. The data (2d-51 and 2d-53) includes data periodically received without dynamic resource allocation. However, in a case that the UE needs to receive an RAR or check whether the Msg3 transmission is successful, the UE performs PDCCH monitoring and data reception.

data transmission in a serving cell of the UE that operates in the FR2. The data (2d-51 and 2d-53) includes data to be periodically transmitted without dynamic resource allocation. However, in an occasion when the random access is performed, transmission of Msg3 in the random access needs to be performed.

The UE may perform the following operations during the set measurement gap:

data transmission or reception for a serving cell (including serving cells of LTE) of the UE that operates in the FR1. (The data (2d-51 and 2d-53) includes data to be sent or received periodically without dynamic resource allocation)

PUCCH transmission (HARQ ACK/NACK, SR, CSI) and CSI transmission sent in a PUSCH for a serving cell (including serving cells of LTE) of the UE that operates in the FR1

CSI information (including CSI information to be sent semi-persistently) transmission on a PUSCH in a serving cell (including serving cells of LTE) of the UE that operates in the FR1.

Accordingly, based on the type of the set measurement gap, the UE may continue data transmission or reception even in the measurement gap in some serving cells based on settings by performing different operations for serving cells related and not related to the measurement gap.

Figure 2E:
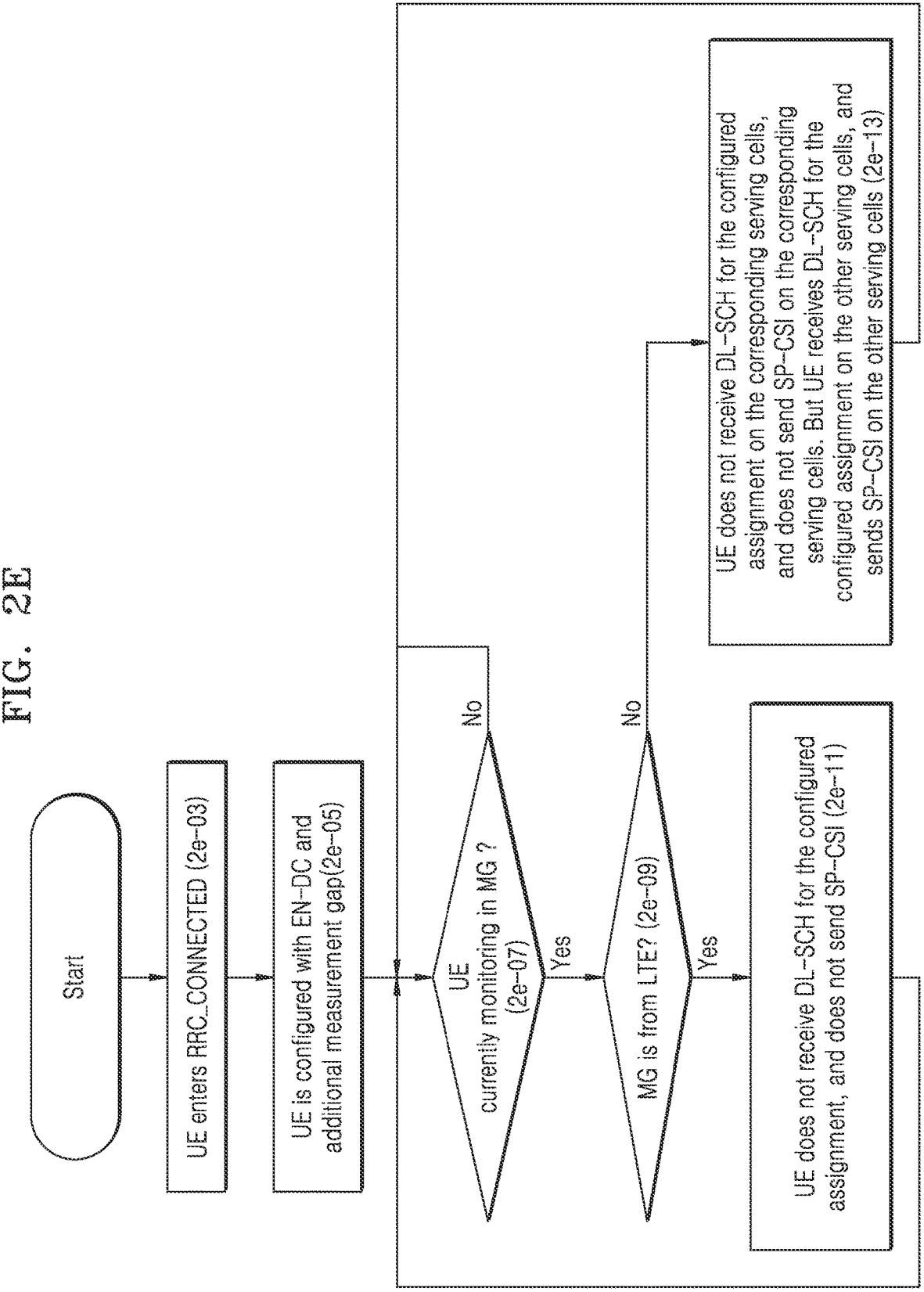
FIG. 2E is a flowchart illustrating another method for communicating data in a wireless communication system according to an embodiment of the disclosure.

FIG. 2E is a flowchart illustrating another method for communicating data in a wireless communication system according to an embodiment of the disclosure.

Referring to FIG. 2E, in an embodiment of the disclosure, a UE has been in an idle (RRC_IDLE) state and in operation (2e-03), enters into a connection mode (RRC_CONNECTED) by completing connection setup with an LTE base station for data transmission or reception.

In an embodiment of the disclosure, the DC technology may allow the UE to connect to both an LTE base station and an NR base station. In an exemplary embodiment, the UE may establish communication with the LTE base station and after communication is successfully established with the LTE base station, the UE may subsequently initiate establishing communication with the NR base station. In operation (2e-05), the UE may then be configured with EC-DC and receive information for a measurement gap associated with the NR base station.

Subsequently, the UE may determine whether the UE is currently monitoring during a measurement gap (MG) in operation (2e-07). When it is determined that the UE is currently monitoring during the measurement gap, it may be determined whether the measurement gap is associated with the LTE base station or the NR base station in operation (2e-09). In an exemplary embodiment, the NR base station may transmit the message directly to the UE or via the LTE base station.

When it is determined that the UE is in the measurement gap set by the LTE base station, in operation (2e-11) the UE may not perform the following operations in order to measure frequencies set for measurement by the LTE base station in the measurement gap:

PUCCH transmission (HARQ ACK/NACK, SR, CSI)

semi-persistent CSI transmission (limited to the NR base station) on a PUSCH (to be sent in cycles based on the RRC configuration)

SRS transmission

PDCCH monitoring and data reception. However, in a case that the UE needs to receive an RAR or check whether the Msg3 transmission is successful, the UE performs PDCCH monitoring and data reception.

data transmission. However, in an occasion when the random access is performed, transmission of Msg3 in the random access needs to be performed.

All of the above operations may be applied for operations with the LTE and NR base stations.

When the UE is in the measurement gap set by the NR base station, the UE may further determine which one of frequency ranges the measurement gap belongs to. As described above, the frequency ranges may include the FR1 and the FR2. Accordingly, when the NR base station is associated with a measurement gap for the FR2 and the UE is currently in the measurement gap associated with the NR base station, in operation (2e-13) the UE may not perform the following operations in order to measure the frequency in the frequency range (the FR2 in this example) set for measurement by the NR base station:

PUCCH transmission (HARQ ACK/NACK, SR, CSI) in a serving cell of the UE that operates in the FR2

CSI information (including CSI information for semi-persistent transmission) transmission on a PUSCH in a serving cell of the UE that operates in the FR2.

SRS transmission in a serving cell of the UE that operates in the FR2.

PDCCH monitoring and data reception in a serving cell of the UE that operates in the FR2. The data includes data periodically received without dynamic resource allocation. However, in a case that the UE needs to receive an RAR or check whether the Msg3 transmission is successful, the UE performs PDCCH monitoring and data reception.

data transmission in a serving cell of the UE that operates in the FR2. The data includes data to be periodically transmitted without dynamic resource allocation. However, in an occasion when the random access is performed, transmission of Msg3 in the random access needs to be performed.

However, the UE may perform the following operations during the set measurement gap:

data transmission or reception for a serving cell (including serving cells of LTE) of the UE that operates in the FR1. (The data includes data to be sent or received periodically without dynamic resource allocation)

PUCCH transmission (HARQ ACK/NACK, SR, CSI) and CSI transmission sent in a PUSCH for a serving cell (including serving cells of LTE) of the UE that operates in the FR1

CSI information (including CSI information to be sent semi-persistently) transmission on a PUSCH in a serving cell (including serving cells of LTE) of the UE that operates in the FR1.

Accordingly, based on the type of the set measurement gap, the UE may continue data transmission or reception even in the measurement gap in some serving cells based on settings by performing different operations for serving cells related and not related to the measurement gap.

Figure 2F:
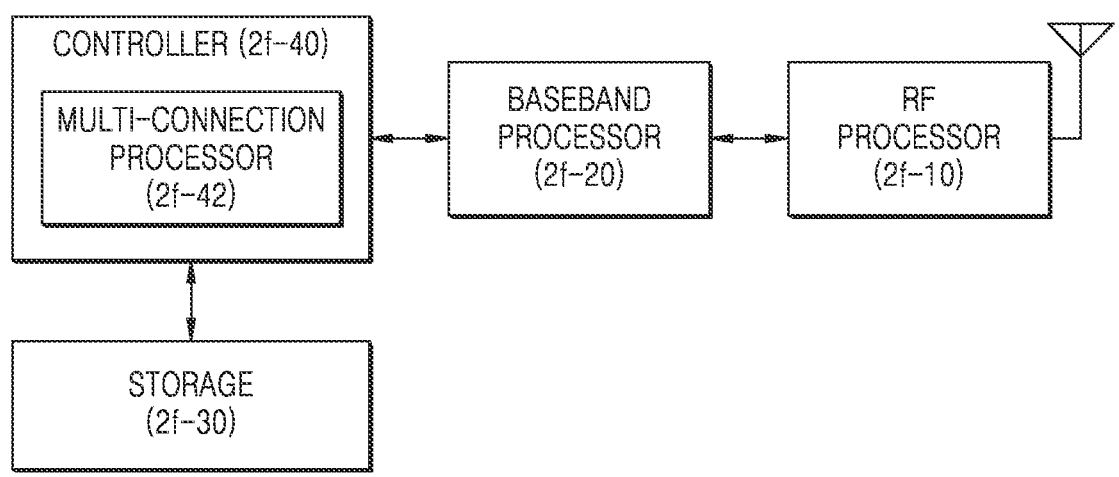
FIG. 2F is a block diagram of a UE in a wireless communication system according to an embodiment of the disclosure.

FIG. 2F is a block diagram of a UE in a wireless communication system according to an embodiment of the disclosure.

Referring to FIG. 2F, in the embodiment of the disclosure, the UE may include an RF processor 2*fi*-10, a baseband processor 2*fi*-20, a storage 2*f*-30, and a controller 2*f*-40.

The RF processor 2*f*-10 may perform functions, such as band conversion, amplification, etc., of a signal to transmit or receive the signal on a radio channel Specifically, the RF processor 2*f*-10 may up-convert a baseband signal provided from the baseband processor 2*f*-20 to an RF band signal for transmission through an antenna, and down-convert an RF band signal received through the antenna to a baseband signal. For example, the RF processor 2*f*-10 may include a transmission filter, a receive filter, an amplifier, a mixer, an oscillator, a digital to analog converter (DAC), an analog to digital converter (ADC), etc. Although a single antenna is shown in FIG. 2F, the UE may be equipped with multiple antennas. The RF processor 2*f*-10 may also include multiple RF chains. Furthermore, the RF processor 2*f*-10 may perform beamforming. For beamforming, the RF processor 2*f*-10 may control the phase and amplitude of each signal to be sent or received through the multiple antennas or antenna elements.

The baseband processor 2*f*-20 may perform conversion between a baseband signal and a bit sequence based on the physical layer standard of the system. For example, for data transmission, the baseband processor 2*f*-20 may generate complex symbols by encoding and modulating a bit sequence for transmission. Furthermore, for data reception, the baseband processor 2*f*-20 may reconstruct a received bit sequence by demodulating and decoding the baseband signal provided from the RF processor 2*f*-10. For example, in a case of conforming to an OFDM method, for data transmission, the baseband processor 2*f*-20 generates complex symbols by encoding and modulating a bit sequence for transmission, map the complex symbols to subcarriers, and perform IFFT operation and CP insertion to construct OFDM symbols. Furthermore, for data reception, the baseband processor 2*f*-20 may divide a baseband signal provided from the RF processor 2*f*-10 into OFDM symbol units, reconstruct the signals mapped to the subcarriers through a fast Fourier transform (FFT) operation and then reconstruct a received bit sequence through demodulation and decoding.

The baseband processor 2*f*-20 and the RF processor 2*f*-10 may transmit or receive signals as described above. Hence, the baseband processor 2*f*-20 and the RF processor 2*f*-10 may be referred to as a transmitter, a receiver, a transceiver, or a communicator. Further, at least one of the baseband processor 2*f*-20 or the RF processor 2*f*-10 may include different communication modules to support many different radio access technologies. Furthermore, at least one of the baseband processor 2*f*-20 or the RF processor 2*f*-10 may include different communication modules to process different frequency band signals. For example, the different radio access technologies may include a WLAN, e.g., the IEEE 802.11, a cellular network, e.g., LTE, etc. Moreover, the different frequency bands may include an SHF band, e.g., 2.5 GHz or 5 GHz, and an mmwave band, e.g., 60 GHz.

The storage 2*f*-30 may store a basic program for operation of the UE, an application program, data like settings information. Especially, the storage 2*f*-30 may store information relating to a WLAN node that performs wireless communication using a WLAN access technology. The storage 2*f*-30 may also provide stored data at the request of the controller 2*f*-40.

The controller 2*f*-40 may control general operations of the UE. For example, the controller 2*f*-40 may control the baseband processor 2*f*-20 and the RF processor 2*f*-10 for signal transmission or reception. The controller 2*f*-40 may also record or read data onto or from the storage 2*f*-30. For this, the controller 2*f*-40 may include at least one processor. For example, the controller 2*f*-40 may include a CP for controlling communication and an AP for controlling a higher layer, such as an application program. In an embodiment of the disclosure, the controller 2*f*-40 may include a multi-connection processor 2*f*-42 for performing a process for operation in a multi-connection mode. For example, the controller 2*f*-40 may control the UE to perform the operation procedure as shown in FIG. 2D or 2E.

In an embodiment of the disclosure, the controller 2*f*-40 may give an instruction to perform an operation determined based on the type of a set measurement gap.

The disclosure relates to operation of the UE in a measurement gap when the UE is allocated the measurement gap for measurement of adjacent cells in a wireless communication system, for example, in a 3GPP 5G NR technology.

According to the disclosure, the UE may prevent unnecessary operation by stopping certain operation in certain serving cells during a set measurement gap, and continue to perform communication with unrelated cells to measure an adjacent cell.

Figure 3:
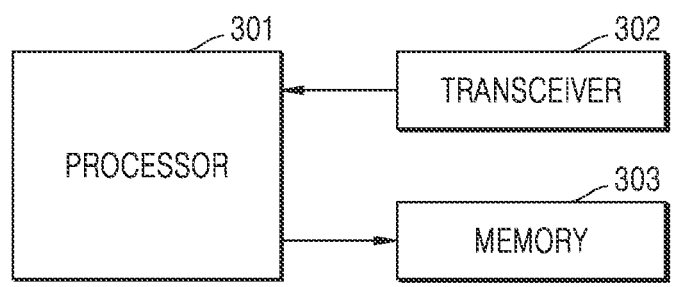
FIG. 3 is a block diagram of a UE according to an embodiment of the disclosure.

FIG. 3 is a block diagram of a UE according to an embodiment of the disclosure.

Referring to FIG. 3, the UE may include a processor 301, a transceiver 302, and a memory 303. Herein, the processor 301 may be defined to be a circuit, an application specific integrated circuit (ASIC), or at least one processor.

The UE according to an embodiment of the disclosure may correspond to the UE as described above in connection with FIGS. 1I and 2F.

The processor 301 may control general operation of the UE. For example, the processor 301 may control signal flows among the respective blocks to perform an operation according to the aforementioned flowcharts. The processor 301 according to an embodiment of the disclosure may correspond to the controller as described above in connection with FIGS. 1I and 2F.

In an embodiment of the disclosure, the processor 301 may receive an identifier additionally allocated for a required range, thereby reducing power consumption of the UE.

According to an embodiment of the disclosure, the processor 301 may prevent unnecessary operation by stopping certain operation in certain serving cells during a set measurement gap, and continue to perform communication with unrelated cells to measure an adjacent cell.

In an embodiment of the disclosure, the transceiver 302 may transmit or receive a signal. In an embodiment of the disclosure, the transceiver 302 may correspond to at least one of the baseband processor or the RF processor as described above in connection with FIGS. 1I and 2F.

In an embodiment of the disclosure, the memory 303 may store a basic program for operation of the UE, an application program, data like settings information. The memory 303 according to an embodiment of the disclosure may correspond to the storage as described above in connection with FIGS. 1I and 2F.

Figure 4:
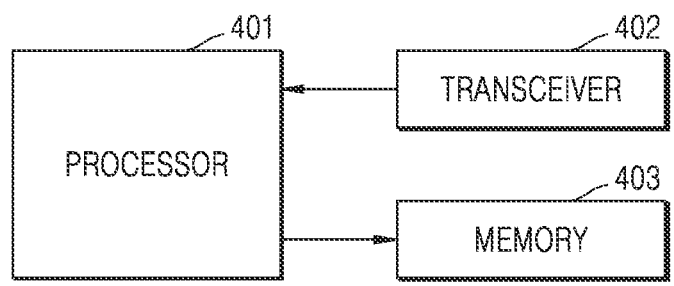
FIG. 4 is a block diagram of a base station according to an embodiment of the disclosure.

FIG. 4 is a block diagram of a base station according to an embodiment of the disclosure.

Referring to FIG. 4, the base station may include a processor 401, a transceiver 402, and a memory 403. The base station described in connection with FIG. 4 may correspond to the base station of FIGS. 1A and 2A.

In the disclosure, the processor 401 may be defined to be a circuit, an ASIC, or at least one processor. The processor 401 may control general operation of the base station according to various embodiments of the disclosure.

In an embodiment of the disclosure, the processor 401 may additionally allocate an identifier, and transmit the identifier to a UE, allowing the UE to receive the identifier in a required range to reduce power consumption.

Furthermore, according to an embodiment of the disclosure, the processor 401 may set a measurement gap for a UE, allowing the UE to stop certain operation in certain serving cells during the measurement gap and continue to perform communication with unrelated cells to measure an adjacent cell.

In an embodiment of the disclosure, the transceiver 402 may transmit or receive a signal.

The memory 403 may store at least one of information received or for transmission by the transceiver 402 or information generated by the processor 401.

Methods according to the claims of the disclosure or the various embodiments of the disclosure described in the specification may be implemented in hardware, software, or a combination of hardware and software.

When implemented in software, a computer-readable storage medium storing one or more programs (software modules) may be provided. One or more programs stored in the computer-readable storage medium are configured for execution by one or more processors in an electronic device. The one or more programs may include instructions that cause the electronic device to perform the methods in accordance with the claims of the disclosure or the various embodiments of the disclosure described in the specification.

The programs (software modules, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a Local Area Network (LAN), a wide area network (WAN), or a storage area network (SAN), or a combination thereof. The storage device may be connected to an apparatus performing the various embodiments of the disclosure through an external port. In addition, a separate storage device in the communication network may be connected to the apparatus performing the various embodiments of the disclosure.

In the various embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

While the disclosure has been shown and described with reference to various embodiments thereof, one or more of the various embodiments may be used together. In addition, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, a radio resource control (RRC) message including information indicating a modulation coding scheme cell radio network temporary identifier (MCS-C-RNTI), wherein the information indicating the MCS-C-RNTI is associated with an MCS table; and
   in case that a physical downlink shared channel (PDSCH) associated with the MCS-C-RNTI and a PDSCH associated with a configured scheduling RNTI (CS-RNTI) partially or fully overlap in time, receiving, from the base station, the PDSCH associated with the MCS-C-RNTI based on the information indicating the MCS-C-RNTI.

2. The method of claim 1, wherein in case that the PDSCH associated with the MCS-C-RNTI is received, the PDSCH associated with the CS-RNTI is not received from the base station.

3. The method of claim 1, wherein the receiving of the PDSCH associated with the MCS-C-RNTI comprises:
 decoding the PDSCH associated with the MCS-C-RNTI based on the MCS table.

4. The method of claim 1, further comprising:
 in case that the PDSCH associated with the MCS-C-RNTI, the PDSCH associated with the CS-RNTI or a PDSCH associated with a cell RNTI (C-RNTI) partially or fully overlap in time with a PDSCH associated with a random access RNTI (RA-RNTI), receiving, from the base station, a random access response based on the PDSCH associated with the RA-RNTI.

5. The method of claim 4, wherein in case that the random access response is received based on the PDSCH associated with the RA-RNTI, the PDSCH associated with the MCS-C-RNTI, the PDSCH associated with the CS-RNTI or the PDSCH associated with the C-RNTI is not received from the base station.

6. A terminal in a wireless communication system, the terminal comprising:
 a transceiver; and
 at least one processor configured to:
  receive via the transceiver, from a base station, a radio resource control (RRC) message including information indicating a modulation coding scheme cell radio network temporary identifier (MCS-C-RNTI), wherein the information indicating the MCS-C-RNTI is associated with an MCS-table, and
  in case that a physical downlink shared channel (PDSCH) associated with the MCS-C-RNTI and a PDSCH associated with a configured scheduling RNTI (CS-RNTI) partially or fully overlap in time, receive via the transceiver, from the base station, the PDSCH associated with the MCS-C-RNTI based on the information indicating the MCS-C-RNTI.

7. The terminal of claim 6, wherein in case that the PDSCH associated with the MCS-C-RNTI is received, the PDSCH associated with the CS-RNTI is not received from the base station.

8. The terminal of claim 6, wherein the at least one processor is further configured to:
 decode the PDSCH associated with the MCS-C-RNTI based on the MCS table.

9. The terminal of claim 6, wherein the at least one processor is further configured to:
 in case that the PDSCH associated with the MCS-C-RNTI, the PDSCH associated with the CS-RNTI or a PDSCH associated with a cell RNTI (C-RNTI) partially or fully overlap in time with a PDSCH associated with a random access RNTI (RA-RNTI), receive via the transceiver, from the base station, a random access response based on the PDSCH associated with the RA-RNTI.

10. The terminal of claim 9, wherein in case that the random access response is received based on the PDSCH associated with the RA-RNTI, the PDSCH associated with the MCS-C-RNTI, the PDSCH associated with the CS-RNTI or the PDSCH associated with the C-RNTI is not received from the base station.

* * * * *